US011849458B2

(12) United States Patent
Hassan Hussein et al.

(10) Patent No.: US 11,849,458 B2
(45) Date of Patent: Dec. 19, 2023

(54) PUNCTURED/ON-DEMAND CONTROL INFORMATION FOR FLEXIBLE/FULL DUPLEX COMMUNICATION

(71) Applicant: Fraunhofer-Gesellschaft zur Förderung der angewandten Forschung e.V., Munich (DE)

(72) Inventors: Khaled Shawky Hassan Hussein, Erlangen (DE); Rudraksh Shrivastava, Fürth (DE); Thomas Heyn, Fürth (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 82 days.

(21) Appl. No.: 16/786,115

(22) Filed: Feb. 10, 2020

(65) Prior Publication Data

US 2020/0236661 A1    Jul. 23, 2020

Related U.S. Application Data

(63) Continuation of application No. PCT/EP2018/072283, filed on Aug. 16, 2018.

(30) Foreign Application Priority Data

Aug. 17, 2017  (EP) .................... 17186751
Oct. 25, 2017  (EP) .................... 17198410

(51) Int. Cl.
*H04L 5/14*        (2006.01)
*H04W 72/23*       (2023.01)
*H04W 72/21*       (2023.01)

(52) U.S. Cl.
CPC ............... *H04W 72/23* (2023.01); *H04L 5/14* (2013.01); *H04W 72/21* (2023.01)

(58) Field of Classification Search
CPC ............. H04W 48/12; H04W 72/0413; H04W 72/042; H04W 72/0446; H04W 72/1289; H04L 5/14
See application file for complete search history.

(56) References Cited

U.S. PATENT DOCUMENTS

2015/0334686 A1  11/2015  Ji et al.
2015/0334702 A1  11/2015  Ji et al.
(Continued)

FOREIGN PATENT DOCUMENTS

CN    104937991 A    9/2015
CN    105940624 A    9/2016
(Continued)

OTHER PUBLICATIONS

Julius Robson et al., "A White Paper by the NGMN Alliance—Small Cell Backhaul Requirements", NGMN the Engine of Broadband Wireless Innovation,Version 1.0, Jun. 4, 2012.
(Continued)

*Primary Examiner* — Bo Hui A Zhu
(74) *Attorney, Agent, or Firm* — NKL Law; Jae Youn Kim

(57) ABSTRACT

Embodiments provide a transceiver of a wireless communication network, wherein the transceiver is configured to evacuate/empty/puncture/shorten a downlink transmission of a control information to accommodate an uplink transmission of another transmitter within the downlink transmission.

37 Claims, 11 Drawing Sheets

(56) References Cited

U.S. PATENT DOCUMENTS

| | | |
|---|---|---|
| 2015/0358998 A1 | 12/2015 | Golitschek Edler Von Elbwart et al. |
| 2016/0302175 A1 | 10/2016 | Blankenship et al. |
| 2016/0330011 A1 | 11/2016 | Lee et al. |
| 2016/0337108 A1 | 11/2016 | Choi et al. |
| 2017/0013628 A1 | 1/2017 | Kim et al. |
| 2017/0310435 A1 | 10/2017 | Wei et al. |
| 2018/0227906 A1* | 8/2018 | Yang ............... H04W 74/00 |
| 2018/0262311 A1* | 9/2018 | Wang ............... H04L 5/0044 |
| 2019/0200235 A1* | 6/2019 | Lyu ................. H04L 5/0094 |

FOREIGN PATENT DOCUMENTS

| | | |
|---|---|---|
| CN | 106063178 A | 10/2016 |
| CN | 106605424 A | 4/2017 |
| EP | 3327975 A1 | 5/2018 |
| WO | 2017/018758 A1 | 2/2017 |

OTHER PUBLICATIONS

Nokia et al., "Punctured Scheduling for Low Latency Transmissions"; 3GPP Draft; RI-165381, 3rd Generation Partnership Project (3GPP); vol. RAN WGI, No. Nanjing, P.R. China, May 23-27, 2016, May 13, 2016 (May 13, 2016), XP051096643, Retrieved from the Internet: URL:http://www.3gpp.org/ftp/tsg_ra/WG1_RL1/TSGR1_85/Docs/.

Qualcomm Incorporated, "DL channel design for shortened TTI", vol. RAN WG1, No. Nanjing, China; May 23-27, 2016, 3GPP Draft; R1-164458 DL Channel Design for Shortened TTI, 3rd Generation Partnership Project (3GPP), Mobile Competence Centre ; 650, Route Des Lucioles ; F-06921 Sophia-Antipolis Cedex ; France, URL: http://www.3gpp.org/ftp/tsg_ran/WG1_RL1/TSGR1_85/Docs/.

Huawei et al., "On control signaling for duplexing flexibility", RI-1700079, 3GPP tsg_ran\WGI_RLI, Jan. 9, 2017, Jan. 16-20, 2017.

Qiang Xu, "Office Action for CN Application No. 201880053319.7", dated Dec. 3, 2021, CNIPA, China.

* cited by examiner

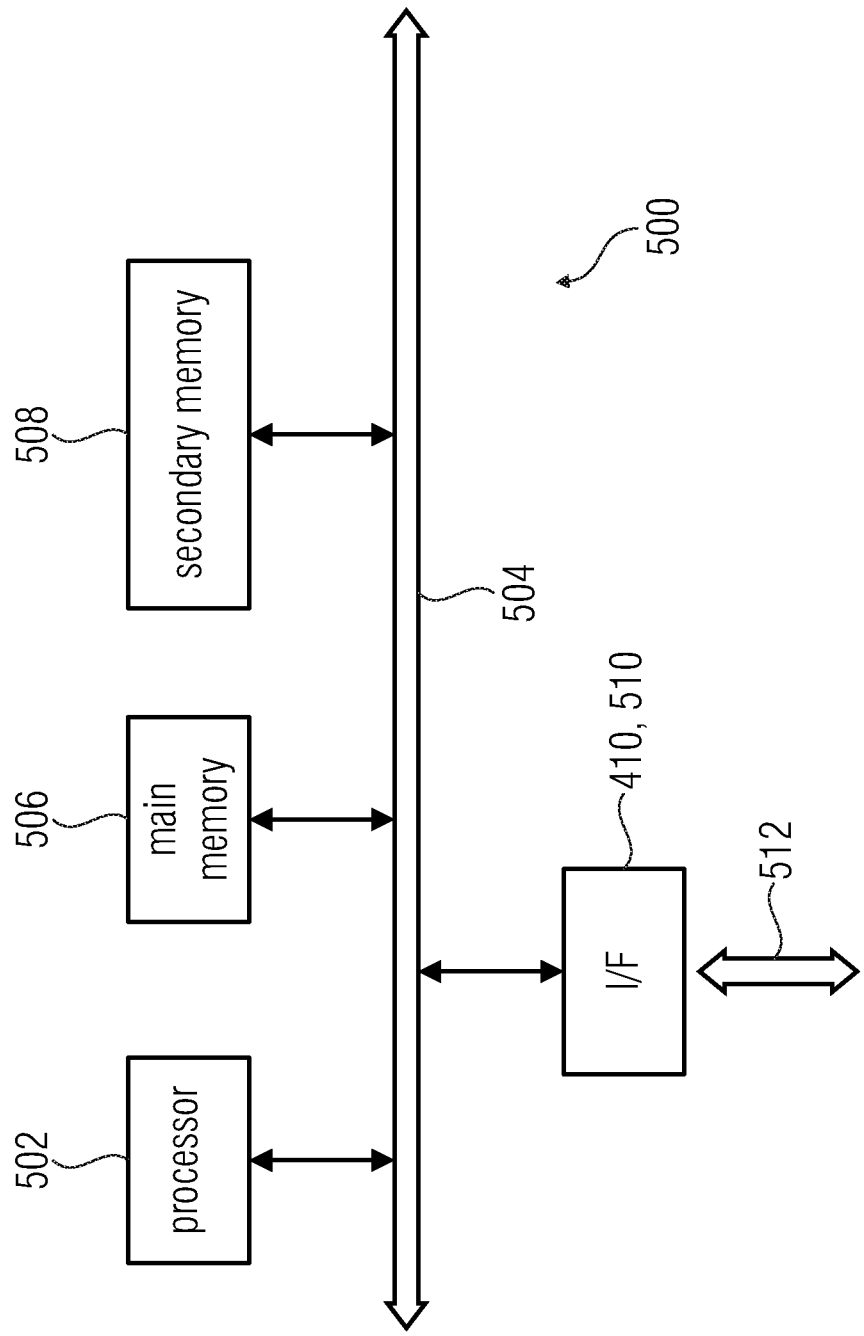

PUNCTURED/ON-DEMAND CONTROL INFORMATION FOR FLEXIBLE/FULL DUPLEX COMMUNICATION

CROSS-REFERENCE TO RELATED APPLICATIONS

This application is a continuation of copending International Application No. PCT/EP2018/072283, filed Aug. 16, 2018, which is incorporated herein by reference in its entirety, and additionally claims priority from European Application No. 17 186 751.8, filed Aug. 17, 2017, and from European Application No. 17 198 410.7, filed Oct. 25, 2017, which are both incorporated herein by reference in their entirety.

BACKGROUND OF THE INVENTION

The present invention relates to the field of wireless communication networks, and more specifically, to concepts for transmitting data in wireless communication networks. Embodiments of the present invention relate to punctured/on-demand control information for flexible/full duplex communication.

FIG. 1 is a schematic representation of an example of a wireless network 100 including a core network 102 and a radio access network 104. The radio access network 104 may include a plurality of base stations $eNB_1$ to $eNB_5$, each serving a specific area surrounding the base station schematically represented by respective cells $106_1$ to $106_5$. The base stations are provided to serve users within a cell. A user may be a stationary device or a mobile device. Further, the wireless communication system may be accessed by mobile or stationary IoT devices which connect to a base station or to a user. The mobile devices or the IoT devices may include physical devices, ground based vehicles, such as robots or cars, aerial vehicles, such as manned or unmanned aerial vehicles (UAVs), the latter also referred to as drones, buildings and other items having embedded therein electronics, software, sensors, actuators, or the like as well as network connectivity that enable these devices to collect and exchange data across an existing network infrastructure. FIG. 1 shows an exemplary view of only five cells, however, the wireless communication system may include more such cells. FIG. 1 shows two users $UE_1$ and $UE_2$, also referred to as user equipment (UE), that are in cell $106_2$ and that are served by base station $eNB_2$. Another user $UE_3$ is shown in cell $106_4$ which is served by base station $eNB_4$. The arrows $108_1$, $108_2$ and $108_3$ schematically represent uplink/downlink connections for transmitting data from a user $UE_1$, $UE_2$ and $UE_3$ to the base stations $eNB_2$, $eNB_4$ or for transmitting data from the base stations $eNB_2$, $eNB_4$ to the users $UE_1$, $UE_2$, $UE_3$. Further, FIG. 1 shows two IoT devices $110_1$ and $110_2$ in cell $106_4$, which may be stationary or mobile devices. The IoT device $110_1$ accesses the wireless communication system via the base station $eNB_4$ to receive and transmit data as schematically represented by arrow $112_1$. The IoT device $110_2$ accesses the wireless communication system via the user $UE_3$ as is schematically represented by arrow $112_2$. The respective base station $eNB_1$ to $eNB_5$ may be connected to the core network 102, e.g. via the S1 interface, via respective backhaul links $114_1$ to $114_5$, which are schematically represented in FIG. 1 by the arrows pointing to "core". The core network 102 may be connected to one or more external networks. Further, some or all of the respective base station $eNB_1$ to $eNB_5$ may connected, e.g. via the X1 or X2 interface, with each other via respective backhaul links $116_1$ to $116_5$, which are schematically represented in FIG. 1 by the arrows pointing to "enBs"

The wireless network or communication system depicted in FIG. 1 may by a heterogeneous network having two distinct overlaid networks, a network of macro cells with each macro cell including a macro base station, like base station $eNB_1$ to $eNB_5$, and a network of small cell base stations (not shown in FIG. 1), like femto or pico base stations.

For data transmission, a physical resource grid may be used. The physical resource grid may comprise a set of resource elements to which various physical channels and physical signals are mapped. For example, the physical channels may include the physical downlink and uplink shared channels (PDSCH, PUSCH) carrying user specific data, also referred to as downlink and uplink payload data, the physical broadcast channel (PBCH) carrying for example a master information block (MIB) and a system information block (SIB), the physical downlink and uplink control channels (PDCCH, PUCCH) carrying for example the downlink control information (DCI), etc. For the uplink, the physical channels may further include the physical random-access channel (PRACH or RACH) used by UEs for accessing the network once a UE synchronized and obtained the MIB and SIB. The physical signals may comprise reference signals (RS), synchronization signals and the like. The resource grid may comprise a frame having a certain duration, like 10 milliseconds, in the time domain and having a given bandwidth in the frequency domain. The frame may have a certain number of subframes of a predefined length, e.g., 2 subframes with a length of 1 millisecond. Each subframe may include two slots of 6 or 7 OFDM symbols depending on the cyclic prefix (CP) length.

The wireless communication system may be any single-tone or multicarrier system using frequency-division multiplexing, like the orthogonal frequency-division multiplexing (OFDM) system, the orthogonal frequency-division multiple access (OFDMA) system, or filtered orthogonal frequency-division multiplexing (f-OFDM), or any other IFFT-based signal with or without CP, e.g. DFT-s-OFDM. Other waveforms, like non-orthogonal waveforms for multiple access, e.g. filter-bank multicarrier (FBMC), generalized frequency division multiplexing (GFDM) or universal filtered multi carrier (UFMC), may be used. The wireless communication system may operate, e.g., in accordance with the LTE-Advanced pro standard or the 5G or NR (New Radio) standard.

In the wireless communication network as shown in FIG. 1 the radio access network 104 may be a heterogeneous network including a network of primary cells, each including a primary base station, also referred to as a macro base station. Further, a plurality of secondary base stations, also referred to as small cell base stations, may be provided for each of the macro cells. FIG. 2 is a schematic representation of a cell, like cell $106_1$ in FIG. 1, having two distinct overlaid networks, the networks comprising a macro cell network including the macro cell $106_1$, and a small cell network. Although FIG. 2 represents only a single macro cell, it is noted that one or more of the other cells in FIG. 1 may also use the overlaid networks. The small cell network comprises a plurality of small cell base stations $SeNB_1$ to $SeNB_5$ each operating within a respective area $120_1$ to $120_5$, also referring as the coverage area of the small cell. The small cell base stations $SeNB_1$ to $SeNB_5$ may be controlled by the macro cell base station $MeNB_1$ to which the respective small cell base stations $SeNB_1$ to $SeNB_5$ are connected via respective backhaul links $122_1$ to $122_5$. Rather than connecting the small cell base stations via the backhaul links to the macro cell base station, one or more of the small cell base stations may be coupled to the core network via respective backhaul links. FIG. 2 further shows a user equipment UE being served by the macro cell base station MeNB$_1$ as indicated by arrow 124$_1$ and by the small cell base station SeNB$_1$, as indicated schematically by the arrow 124$_2$.

FIG. 3 is a further schematic representation of a plurality of small cells 120$_1$ to 120$_3$ of a macro cell (not shown). The macro cell may be similar to that in FIG. 2. Each small cell may serve one or more UEs. The respective small cell base stations SeNB$_1$, SeNB$_2$, SeNB$_3$, . . . , other than in FIG. 2, are connected via the backhaul links or connections 102$_1$ to 102$_3$ to the core network 102. The respective small cells 102$_1$ to 102$_3$ may be directly connected with each other via the X2 interface, as schematically indicated in FIG. 3. The transport network connecting the respective small cells to the core network 102 may be an optical fiber network including one or more points of presence (PoP) at which a plurality of small cells are connected to the transport network. Further details about a backhaul architecture as shown in FIG. 3 is described in reference [1].

The small cells, also referred to as secondary mobile communication cells, SCs, form an overlay network to the network of macro cells, also referred to as primary mobile communication cells, PC. The small cells may be connected via backhaul links (BL) to the macro cell (FIG. 2) and/or to the core network (FIG. 3). The backhaul links may be wired or wireless links, and in case of connecting the small cells via the backhaul links to the core network, the point of presence (PoP) of the transport network (FIG. 3) may serve as an interface to the core network. Each small cell may serve a number of mobile users UE within its coverage area by means of a wireless access link (AL) 124$_2$. Further, the UEs may be connected to the primary cell, for example to receive control signals, and the connection may be referred to as a control link (CL).

In wireless communication networks as described above with reference to FIG. 1 to FIG. 3, full duplex communication, half duplex communication, i.e., time-division duplexing (TDD), frequency-division duplexing (FDD), frequency/time division multiplexing (FDM/TDM), downlink control information (DCI) and uplink control information (UCI) are known.

Thereby, full duplex is a key solution for the 5G and beyond requirements like, e.g., high spectral, high traffic and throughput variations, and extremely high traffic asymmetry needs. Coexistence of different service requirements as ultra-reliable low-latency communication (URLLC) will be facilitated assuming bi-directional transmission in a single frequency band/multi-band.

However, to modify the legacy and canonical way of transmission of existing standards, providing a new mechanism for enabling UL and DL in the same direction at specific/same time is needed. If the current control information is used as is with fixed dedicated bands as in the LTE downlink or uplink, there will be an unwanted interference on the control information. This might not be accepted and violates the performance entailed and robustness of the control information.

Therefore, it is the object of the present invention to provide a concept that allows uplink and downlink transmissions in the same direction at specific/same time.

SUMMARY

An embodiment may have a transceiver of a wireless communication network, wherein the transceiver is configured to puncture a downlink transmission of control information in a channel allocated to the downlink transmission of control information, to obtain within said allocated channel for the downlink transmission of control information a downlink free area for an uplink transmission of a transmitter of the wireless communication network.

Another embodiment may have a transmitter of a wireless communication network, wherein the transmitter is configured to perform an uplink transmission to a transceiver of the wireless communication network in a channel allocated to a downlink transmission of control information from said transceiver, wherein the transmitter is configured to perform said uplink transmission in a downlink free area of said channel allocated to the downlink transmission of control information in dependence on a puncturing indication information indicating said downlink free area for the uplink transmission.

Still another embodiment may have a transceiver of a wireless communication network, wherein the transceiver is configured to puncture a downlink transmission of data in a channel allocated to the downlink transmission of data, to obtain within said allocated channel for the downlink transmission of data a downlink free area for an uplink transmission of control information of another transmitter of the wireless communication network.

Another embodiment may have a transmitter of a wireless communication network, wherein the transmitter is configured to perform an uplink transmission of control information to a transceiver of the wireless communication network in a channel allocated to a downlink transmission of data from said transceiver, wherein the transmitter is configured to perform said uplink transmission in a downlink free area of said channel allocated to the downlink transmission of data responsive to a puncturing indication information indicating said downlink free area for the uplink transmission.

According to another embodiment, a wireless communication network may have: at least one inventive transceiver as mentioned above; and at least one inventive transmitter as mentioned above.

According to another embodiment, a method for operating a transceiver of a wireless communication network may have the step of: puncturing a downlink transmission of control information in a channel allocated to the downlink transmission of control information, to obtain within said allocated channel for the downlink transmission of control information a downlink free area for an uplink transmission of another transmitter of the wireless communication network.

According to another embodiment, a method for operating a transmitter of a wireless communication network may have the step of: uplink transmitting to a transceiver of the wireless communication network in a channel allocated to a downlink transmission of control information from said transceiver, wherein said uplink transmission and/or downlink transmission is performed in a downlink free area of said channel allocated to the downlink transmission of control information in dependence on a puncturing indication information indicating said downlink free area for the uplink transmission.

Another embodiment may have a non-transitory digital storage medium having stored thereon a computer program for performing a method for operating a transceiver of a wireless communication network having the step of: puncturing a downlink transmission of control information in a channel allocated to the downlink transmission of control information, to obtain within said allocated channel for the downlink transmission of control information a downlink free area for an uplink transmission of another transmitter of the wireless communication network, when said computer program is run by a computer.

Still another embodiment may have a non-transitory digital storage medium having stored thereon a computer program for performing a method for operating a transmitter of a wireless communication network having the step of: uplink transmitting to a transceiver of the wireless communication network in a channel allocated to a downlink transmission of control information from said transceiver, wherein said uplink transmission and/or downlink transmission is performed in a downlink free area of said channel allocated to the downlink transmission of control information in dependence on a puncturing indication information indicating said downlink free area for the uplink transmission, when said computer program is run by a computer.

Another embodiment may have a transceiver of a wireless communication network, wherein the transceiver is configured to reconfigure or redistribute a downlink transmission of control information in a channel allocated to the downlink transmission of control information, to obtain within said allocated channel for the downlink transmission of control information a free area free of the downlink transmission of control information for an uplink transmission of a transmitter of the wireless communication network, or a full-duplex communication between the transceiver and the transmitter of the wireless communication network.

Another embodiment may have a method for operating a transceiver of a wireless communication network having the step of: reconfiguring or redistributing a downlink transmission of control information in a channel allocated to the downlink transmission of control information, to obtain within said allocated channel for the downlink transmission of control information a free area free of the downlink transmission of control information for an uplink transmission of a transmitter of the wireless communication network, or a full-duplex communication between the transceiver and the transmitter of the wireless communication network.

Another embodiment may have a transmitter of a wireless communication network, wherein the transmitter is configured to perform an uplink transmission to a transceiver of the wireless communication network, or a full-duplex communication between the transceiver and the transmitter of the wireless communication network in a channel allocated to a downlink transmission of control information from said transceiver, wherein the transmitter is configured to perform said uplink transmission, downlink transmission of data or full-duplex communication in a free area, free of the downlink transmission of control information, of said channel allocated to the downlink transmission of control information responsive to a control information resource reconfiguration or redistribution indication information indicating said free area or indicating the downlink control information resources used or reconfigured or redistributed for the downlink transmission of control information.

Still another embodiment may have a method for operating a transmitter of a wireless communication network having the step of: performing one out of an uplink transmission to a transceiver of the wireless communication network, or a full-duplex communication between the transceiver and the transmitter of the wireless communication network in a channel allocated to a downlink transmission of control information from said transceiver, wherein the transmitter is configured to perform said uplink transmission, downlink transmission of data or full-duplex communication in a free area, free of the downlink transmission of control information, of said channel allocated to the downlink transmission of control information responsive to a control information resource indication information indicating said free area or indicating the downlink control information resources used or reconfigured or redistributed for the downlink transmission of control information.

Another embodiment may have a non-transitory digital storage medium having stored thereon a computer program for performing a method for operating a transceiver of a wireless communication network having the step of: reconfiguring or redistributing a downlink transmission of control information in a channel allocated to the downlink transmission of control information, to obtain within said allocated channel for the downlink transmission of control information a free area free of the downlink transmission of control information for an uplink transmission of a transmitter of the wireless communication network, or a full-duplex communication between the transceiver and the transmitter of the wireless communication network, when said computer program is run by a computer.

Another embodiment may have a non-transitory digital storage medium having stored thereon a computer program for performing a method for operating a transmitter of a wireless communication network having the step of: performing one out of an uplink transmission to a transceiver of the wireless communication network, or a full-duplex communication between the transceiver and the transmitter of the wireless communication network in a channel allocated to a downlink transmission of control information from said transceiver, wherein the transmitter is configured to perform said uplink transmission, downlink transmission of data or full-duplex communication in a free area, free of the downlink transmission of control information, of said channel allocated to the downlink transmission of control information responsive to a control information resource indication information indicating said free area or indicating the downlink control information resources used or reconfigured or redistributed for the downlink transmission of control information, when said computer program is run by a computer.

Embodiments provide a transceiver of a wireless communication network, wherein the transceiver is configured to puncture a downlink transmission of control information (e.g., a downlink control information (DCI)) in a channel (or resource block) allocated to the downlink transmission of control information, to obtain within said allocated channel for the downlink transmission of control information a downlink free area (or resource elements of the resource block, such as a block of symbols) for an uplink transmission of another transmitter of the wireless communication network (and/or for a downlink transmission of data of the transceiver of the wireless communication network).

In embodiments, the downlink free area can be an area free of the downlink transmission of control information.

In embodiments, the transceiver can be configured to puncture the downlink transmission of control information responsive to an uplink transmission request or puncturing request (e.g., having a puncturing indication information) from the transmitter or another transmitter of the wireless communication network.

In embodiments, the transceiver can be configured dynamically and upon need to puncture the downlink transmission of control information responsive to an uplink transmission request or puncturing request (e.g., having a puncturing indication information) from the transmitter or another transmitter of the wireless communication network.

In embodiments, the transceiver can be configured to reconfigure and/or redistribute the control information on another time/frequency resources to avoid the location of either UL transmission or full-duplex transmission.

For example, the transceiver can receive the uplink transmission request or puncturing request from the network itself, a base station (e.g., evolved-node base station (eNB)), or the transmitter (e.g., user equipment) or another transmitter (e.g., user equipment). For instance, a user equipment may need puncturing for his uplink control information, wherein the user equipment may send a signal to inform an evolved-node base station (eNB) with his request for puncturing the downlink control information or the downlink data transmission.

In embodiments, the transceiver can be configured to puncture the downlink transmission of control information in an area indicated by the uplink transmission request or puncturing request, in order to obtain the downlink free area for the uplink transmission.

In embodiments, the transceiver can be configured to reconfigure and/or redistribute the control information on another time/frequency resources to avoid the location of either UL transmission or full-duplex transmission.

In embodiments, the channel allocated to the downlink transmission of control information can be a physical downlink control channel (PDCCH).

In embodiments, the transceiver can be configured to transmit the punctured downlink transmission of control information and to receive the uplink transmission from the other transmitter in the same frequency band.

In embodiments, the transceiver can be configured to transmit a puncturing indication information in the downlink transmission of control information or in a preceding downlink transmission of control information, said puncturing indication information indicating said downlink free area for the uplink transmission of said other transmitter of the wireless communication network.

In embodiments, the transceiver can be configured to transmit the puncturing indication information in a persistent position of the physical downlink control channel or in the punctured physical downlink control channel.

In embodiments, the transceiver can be configured to receive an uplink transmission of control information from said other transmitter of the wireless communication network in said downlink free area for the uplink transmission of said other transmitter or in an allocated uplink transmission data or control channel.

In embodiments, the transceiver can be configured to transmit a downlink control information in an uplink free area of a punctured uplink transmission in a channel allocated to said uplink transmission.

In embodiments, the transceiver can be configured to transmit the punctured portion of the downlink control information in a subsequent channel allocated to the downlink transmission of control information. For example, the transceiver may send the downlink control information (e.g., the punctured, i.e., the taken out) at different location in time.

In embodiments, the transceiver can be a base station of the wireless communication network.

In embodiments, the other transmitter can be a user equipment or base station of the wireless communication network.

Further embodiments provide a transmitter of a wireless communication network, wherein the transmitter is configured to perform an uplink transmission to a transceiver of the wireless communication network (and/or a downlink transmission of data from the transceiver of the wireless communication network) in a channel allocated to a downlink transmission of control information from said transceiver, wherein the transmitter is configured to perform said uplink transmission (and/or downlink transmission of data) in a downlink free area of said channel allocated to the downlink transmission of control information responsive to a puncturing indication information indicating said downlink free area for the uplink transmission.

In embodiments, the downlink free area can be an area free of the downlink transmission of control information.

In embodiments, the channel allocated to the downlink transmission of control information can be a physical downlink control channel (PDCCH).

In embodiments, the transmitter can be configured to receive said puncturing indication information from the transceiver in the downlink transmission of control information or in a preceding downlink transmission of control information.

In embodiments, the transmitter can be configured to receive said puncturing indication information from a database of the wireless communication system.

In embodiments, the puncturing indication information can be a predefined puncturing pattern.

In embodiments, the transmitter can be configured to puncture an uplink transmission in a channel allocated to the uplink transmission, to obtain within said allocated channel for the uplink transmission an uplink free area for a downlink transmission of said transceiver or another transmitter of the wireless communication network.

In embodiments, the transceiver can be a base station of the wireless communication network.

In embodiments, the transmitter can be a user equipment or base station of the wireless communication network.

Further embodiments provide a transceiver of a wireless communication network, wherein the transceiver is configured to puncture a downlink transmission of data (e.g., at least one shortened transmission time interval (sTTI), at least one mini-slot, or a block of symbols) in a channel allocated to the downlink transmission of data, to obtain within said allocated channel for the downlink transmission of data a downlink free area (e.g., the at least one shortened transmission time interval (sTTI), at least one mini-slot, or the block of symbols) for an uplink transmission of another transmitter of the wireless communication network.

In embodiments, the transceiver can be configured to puncture the downlink transmission of data responsive to an uplink transmission request or puncturing request from the transmitter or another transmitter of the wireless communication network.

For example, the transceiver can receive the uplink transmission request or puncturing request from the network itself, a base station (e.g., evolved-node base station (eNB)), or the transmitter (e.g., user equipment) or another transmitter (e.g., user equipment). For instance, a user equipment may need puncturing for his uplink control information, wherein the user equipment may send a signal to inform an evolved-node base station (eNB) with his request for puncturing the downlink control information.

In embodiments, the transceiver can be configured to puncture the downlink transmission of data in an area indicated by the uplink transmission request or puncturing request, in order to obtain the downlink free area for the uplink transmission.

Further embodiments provide a transmitter of a wireless communication network, wherein the transmitter is configured to perform an uplink transmission to a transceiver of the wireless communication network in a channel allocated to a downlink transmission of data from said transceiver, wherein the transmitter is configured to perform said uplink transmission in a downlink free area (e.g., at least one shortened transmission time interval (sTTI), at least one mini-slot, or a block of symbols) of said channel allocated to the downlink transmission of data responsive to a puncturing indication information indicating said downlink free area for the uplink transmission.

In embodiments, the transmitter can be configured to not perform the uplink transmission during a downlink transmission of control information (e.g., physical downlink control channel (PDCCH). Rather, the transmitter can be configured to perform the uplink transmission after the downlink transmission of control information in the downlink free area of the downlink transmission of data signaled by the puncturing indication information.

In embodiments, the transmitter can be configured to perform the uplink transmission after the downlink transmission of control information (e.g., after the physical downlink control channel symbols) on a shortened transmission time interval (sTTI) or mini-slot bases, e.g., using at least one shortened transmission time interval (sTTI) or mini-slot.

Thereby, the position of the (punctured) shortened transmission time interval (sTTI) or mini-slot for the uplink transmission after the downlink transmission of control information can be signaled to the transmitter (e.g., by the transceiver) using a signaling information, such as an indication field. For example, the position where to start the sTTI of UL (after PDCCH) can be signaled to the UE using an indication field.

In embodiments, the transmitter can be configured to perform the uplink transmission delayed by at least one shortened transmission time interval or mini-slot if the downlink transmission of control information is not punctured. For example, the transmitter can be configured to perform a sTTI/mini slot based delayed uplink transmission if puncturing is there or not.

Further embodiments provide a method for operating a transceiver of a wireless communication network. The method comprises a step of puncturing a downlink transmission of control information in a channel allocated to the downlink transmission of control information, to obtain within said allocated channel for the downlink transmission of control information a downlink free area for an uplink transmission of another transmitter of the wireless communication network.

Further embodiments provide a method for operating a transmitter of a wireless communication network. The method comprises a step of uplink transmitting to a transceiver of the wireless communication network in a channel allocated to a downlink transmission of control information from said transceiver, wherein said uplink transmission is performed in a downlink free area of said channel allocated to the downlink transmission of control information responsive to a puncturing indication information indicating said downlink free area for the uplink transmission.

Further embodiments provide a method for operating a transceiver of a wireless communication network. The method comprises puncturing a downlink transmission of data in a channel allocated to the downlink transmission of data, to obtain within said allocated channel for the downlink transmission of data a downlink free area for an uplink transmission of another transmitter of the wireless communication network (and/or for a downlink transmission of data of the transceiver of the wireless communication network).

Further embodiments provide a method for operating a transmitter of a wireless communication network. The method comprises performing an uplink transmission to a transceiver of the wireless communication network (and/or a downlink transmission of data from the transceiver of the wireless communication network) in a channel allocated to a downlink transmission of data from said transceiver, wherein the transmitter is configured to perform said uplink transmission (and/or downlink transmission) in a downlink free area of said channel allocated to the downlink transmission of data in dependence on a puncturing indication information indicating said downlink free area for the uplink transmission.

Further embodiments provide a transceiver of a wireless communication network, wherein the transceiver is configured to evacuate/empty/puncture/shorten a downlink transmission of a control information to accommodate an uplink transmission of another transmitter within the downlink transmission.

In embodiments, the transceiver can be configured to transmit a puncturing indication within a PDCCH transmission.

In embodiments, the puncturing indication can comprise a persistent position in the PDCCH field, or wherein the puncturing indication can be transmitted within the shorten/reduced/remaining PDCCH.

In embodiments, the transceiver can be a base station.

In embodiments, the other transmitter can be a user equipment of the wireless communication network.

Further embodiments provide a transceiver configured to evacuate/empty/puncture/shorten the downlink (DL) transmission of any control information within a decided full-duplex transmission in the opposite direction (uplink) or for any form of flexible duplexing.

Further embodiments provide a transceiver configured to transmit a puncturing indication within the PDCCH transmission. The puncturing indication could be a persistent position in the PDCCH field. It can also be within the shorten/reduced/remaining PDCCH. The puncturing-indication position can be covered with or without full-duplex. It can be static or dynamically configured.

In embodiments, uplink control information can allow full-duplex with the DL data transmission. UL/DL control information can coexist if puncturing is not supported.

In embodiments, the transmission direction can be changed for full-duplex requirements.

Further embodiments provide a UE supporting full-duplex communication. The UE can be treated as two UEs configuring simultaneous UL and DL control information as
 the transceiver configured to evacuate/empty/puncture/shorten the downlink (DL) transmission of any control information within a decided full-duplex transmission in the opposite direction (uplink) or for any form of flexible duplexing; and/or
 the transceiver configured to transmit a puncturing indication within the PDCCH transmission.

Further embodiments provide a transceiver of a wireless communication network, wherein the transceiver is configured to reconfigure or redistribute a downlink transmission of control information in a channel allocated to the downlink transmission of control information, to obtain within said allocated channel for the downlink transmission of control information a free area, free of the downlink transmission of control information, for
 an uplink transmission of a transmitter of the wireless communication network,
 a downlink transmission of the transceiver of the wireless communication network, or a full-duplex communication between the transceiver and the transmitter of the wireless communication network.

In embodiments, the transceiver can be configured to transmit the reconfigured or redistributed portion of the downlink control information in a subsequent channel allocated to the downlink transmission of control information.

In embodiments, the transceiver can be configured to reconfigure or redistribute the downlink transmission of control information by reducing a number of downlink control information resources in one out of time domain and frequency domain to obtain said free area, free of the downlink transmission of control information.

In embodiments, the transceiver can be configured to reconfigure or redistribute the downlink transmission of control information by increasing, in accordance with the reduction of the number of control information resources in one out of time domain and frequency domain, the number of downlink control information resources in the other one out of time domain and frequency domain for the transmission of the downlink control information.

For example, the transceiver can be configured to increase (dynamically or based on demands) the number of downlink control information symbols in the time domain used for the transmission of the downlink control information and reduce its the frequency band accordingly. Naturally, the transceiver also can be configured to increase (dynamically or based on demands) the frequency band used for the transmission of the downlink control information and reduce the number of time domain symbols accordingly.

In embodiments, the transceiver can be configured to transmit a control information resource indication information in the downlink transmission of control information or in a preceding downlink transmission of control information, said control information resource indication information indicating said free area, free of the downlink transmission of control information, and/or the downlink control information resources used for the downlink transmission of control information.

For example, the indication can include the positions (in time and frequency) of the new/reconfigured/redistributed control information. The indication field can be decoded by the receiver and; hence, it should know the position of shortened/distributed/reconfigured control information.

Further embodiments provide a method for operating a transceiver of a wireless communication network, the method comprises a step of reconfiguring or redistributing a downlink transmission of control information in a channel allocated to the downlink transmission of control information, to obtain within said allocated channel for the downlink transmission of control information a free area, free of the downlink transmission of control information, for an uplink transmission of a transmitter of the wireless communication network, a downlink transmission of the transceiver of the wireless communication network, or a full-duplex communication between the transceiver and the transmitter of the wireless communication network.

Further embodiments provide a transmitter of a wireless communication network, wherein the transmitter is configured to perform an uplink transmission to a transceiver of the wireless communication network, a downlink transmission of data from the transceiver of the wireless communication network, or a full-duplex communication between the transceiver and the transmitter of the wireless communication network in a channel allocated to a downlink transmission of control information from said transceiver, wherein the transmitter is configured to perform said uplink transmission, downlink transmission of data or full-duplex communication in a free area, free of the downlink transmission of control information, of said channel allocated to the downlink transmission of control information responsive to a control information resource reconfiguration or redistribution indication information indicating said free area or indicating the downlink control information resources used for the downlink transmission of control information.

Further embodiments provide a method for operating a transmitter of a wireless communication network, the method comprising a step of performing one out of an uplink transmission to a transceiver of the wireless communication network, a downlink transmission of data from the transceiver of the wireless communication network, or a full-duplex communication between the transceiver and the transmitter of the wireless communication network in a channel allocated to a downlink transmission of control information from said transceiver, wherein the transmitter is configured to perform said uplink transmission, downlink transmission of data or full-duplex communication in a free area, free of the downlink transmission of control information, of said channel allocated to the downlink transmission of control information responsive to a control information resource reconfiguration or redistribution indication information indicating said free area or indicating the downlink control information resources used for the downlink transmission of control information.

BRIEF DESCRIPTION OF THE DRAWINGS

Embodiments of the present invention are described herein making reference to the appended drawings, in which:

FIG. 12 illustrates an example of a computer system on which units or modules as well as the steps of the methods described in accordance with the inventive approach may execute.

DETAILED DESCRIPTION OF THE INVENTION

Figure 1:
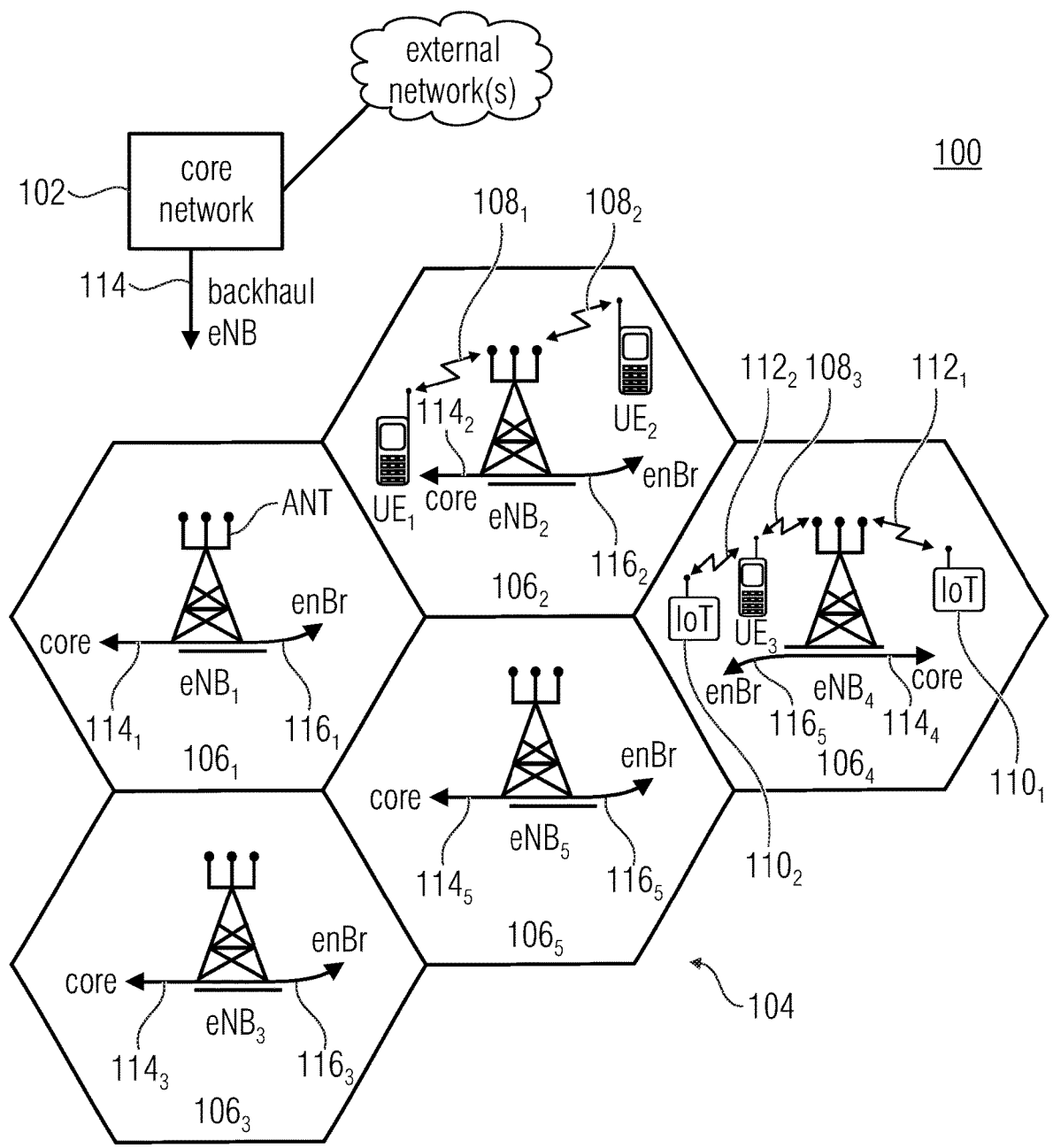
FIG. 1 shows a schematic representation of an example of a wireless communication system.
Figure 2:
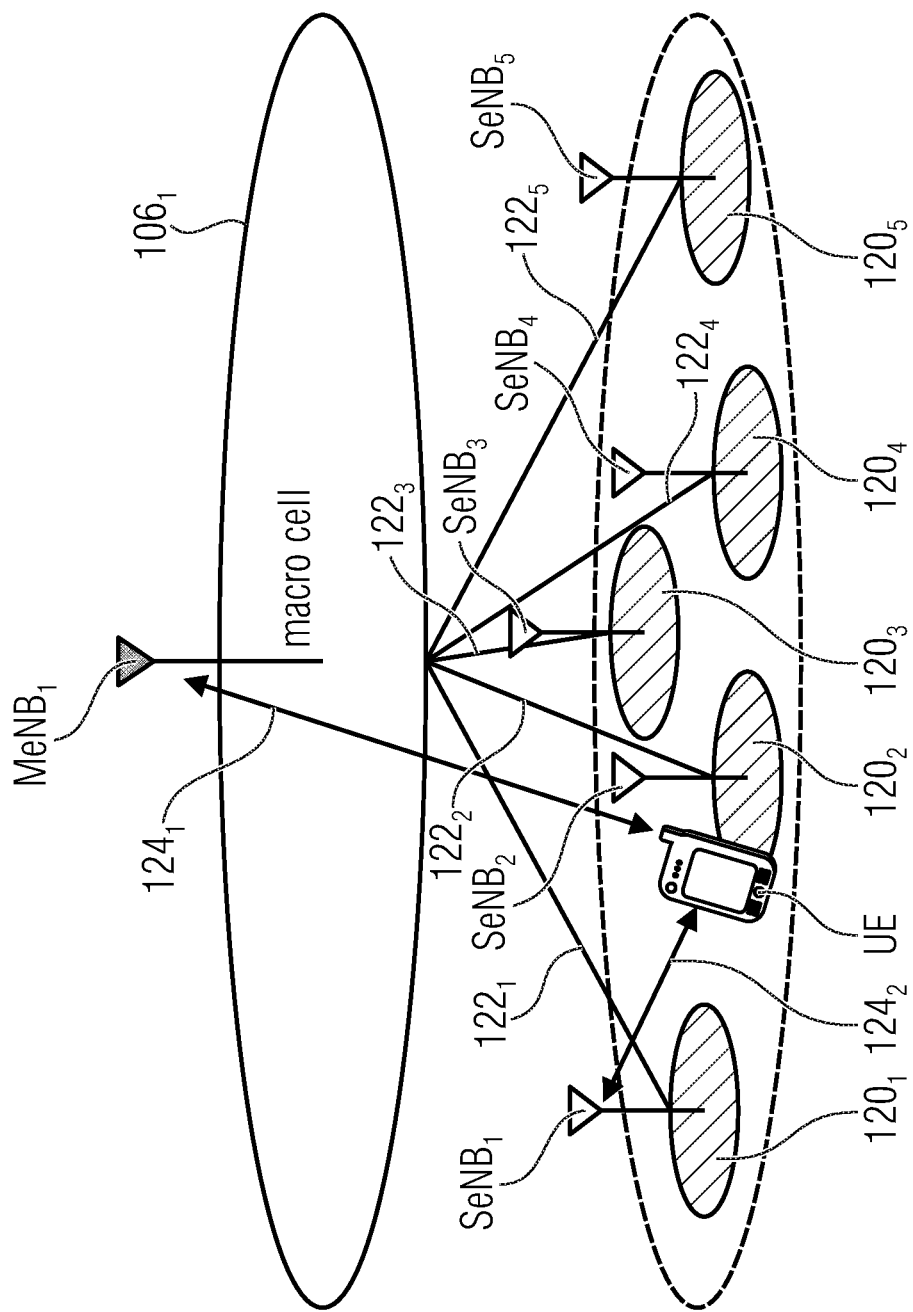
FIG. 2 shows a schematic representation of a cell, like a cell in FIG. 1, having two distinct overlaid networks, namely a macro cell network including a macro cell and a small cell network including small cell base stations connected via backhaul links to the macro cell base station.
Figure 3:
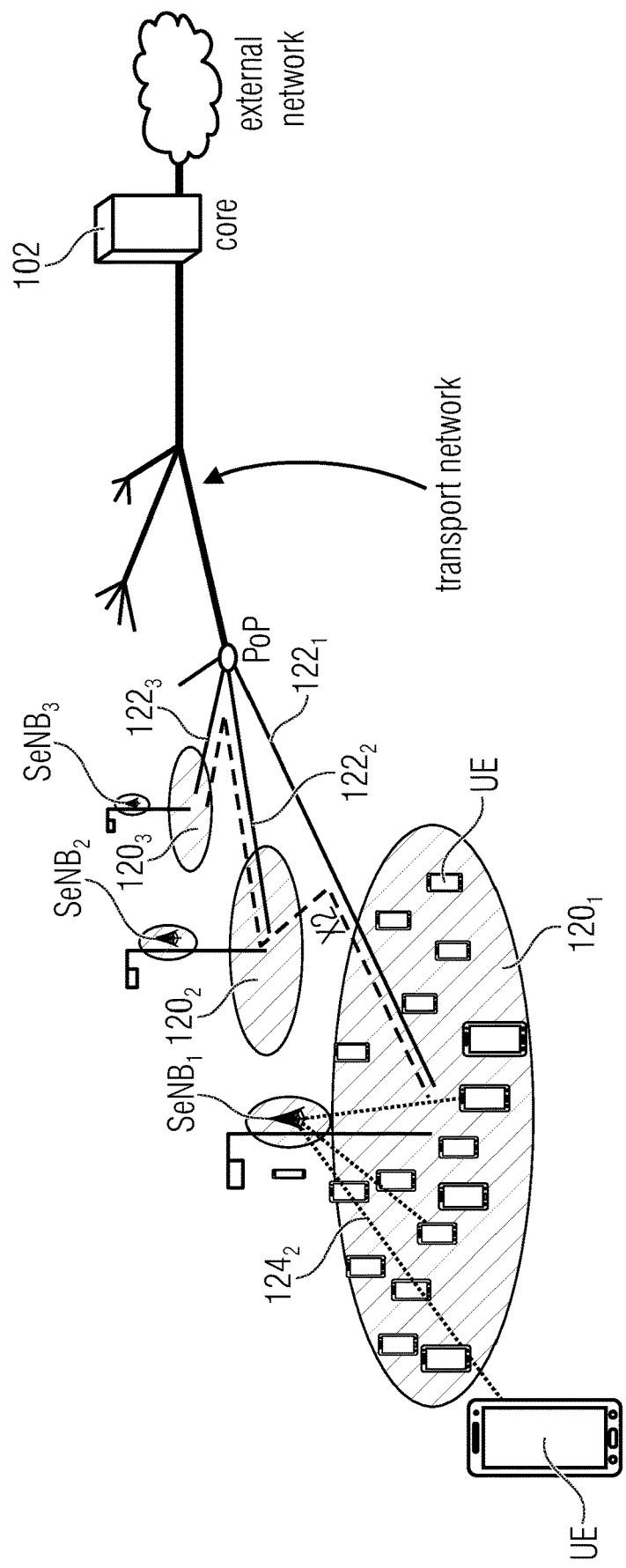
FIG. 3 shows a further schematic representation of a plurality of small cells of a macro cell, similar to FIG. 2, wherein the small cell base stations are connected via backhaul links to each other and to the core network.

Equal or equivalent elements or elements with equal or equivalent functionality are denoted in the following description by equal or equivalent reference numerals.

In the following description, a plurality of details are set forth to provide a more thorough explanation of embodiments of the present invention. However, it will be apparent to one skilled in the art that embodiments of the present invention may be practiced without these specific details. In other instances, well-known structures and devices are shown in block diagram form rather than in detail in order to avoid obscuring embodiments of the present invention. In addition, features of the different embodiments described hereinafter may be combined with each other, unless specifically noted otherwise.

Figure 4:
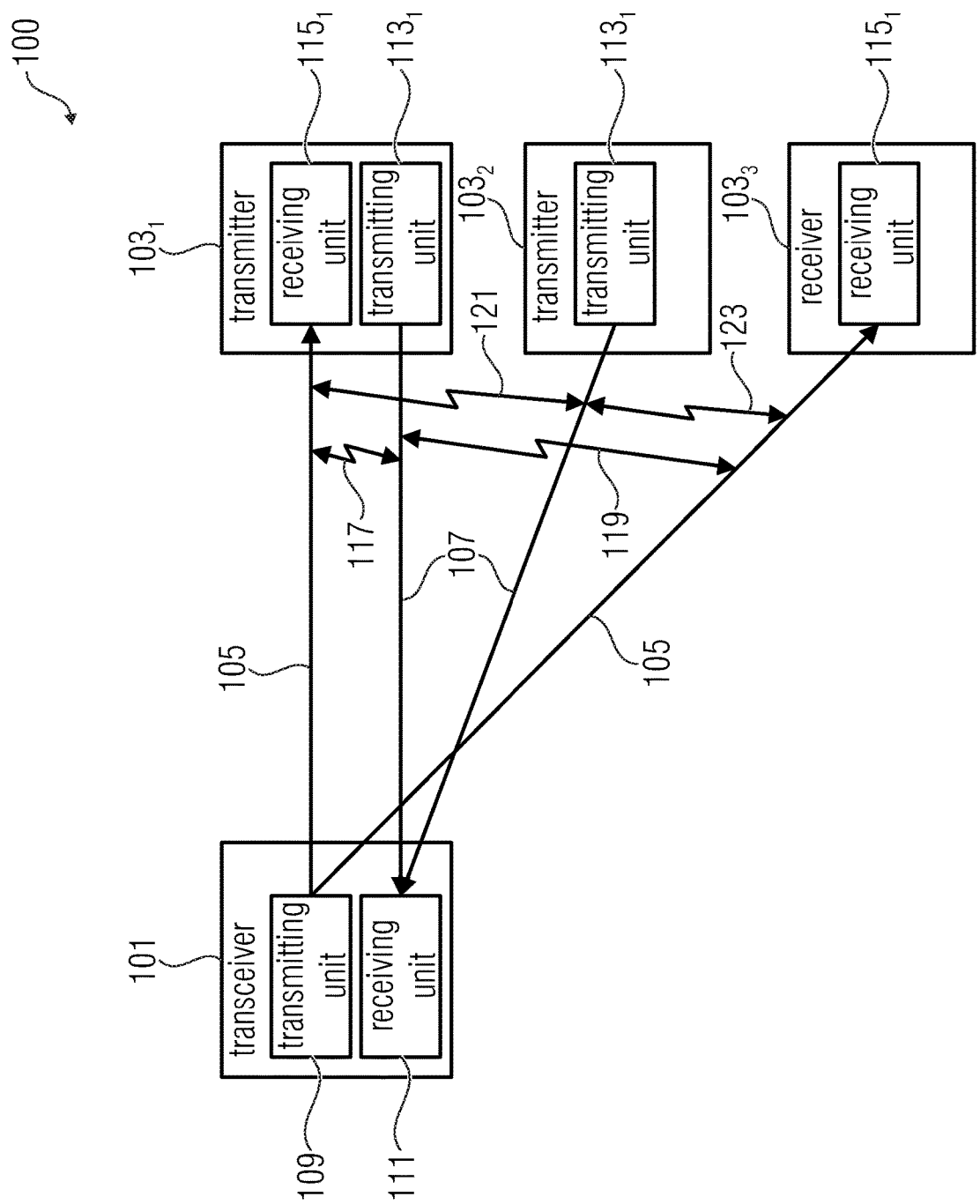
FIG. 4 shows a schematic block diagram of a wireless communication network, according to an embodiment.

FIG. 4 shows a schematic block diagram of a wireless communication network 100, according to an embodiment. The wireless communication network 100 can comprise a transceiver 101 and a transmitter $103_1$.

The transceiver 101 can be configured to puncture a downlink transmission 105 of control information to the transmitter $103_1$ in a channel allocated to the downlink transmission 105 of control information, to obtain within said allocated channel for the downlink transmission 105 of control information a downlink free area for an uplink transmission 107 of the transmitter $103_1$ or another transmitter $103_2$ of the wireless communication network 100.

The transmitter $103_1$ can be configured to perform an uplink transmission 107 to the transceiver 101 of the wireless communication network 100 in a channel allocated to the downlink transmission 105 of control information from said transceiver 101, wherein the transmitter $103_1$ is configured to perform said uplink transmission in a downlink free area of said channel allocated to the downlink transmission 105 of control information responsive to a puncturing indication information indicating said downlink free area for the uplink transmission 107.

In embodiments, the uplink transmission 107 can be performed simultaneously to the downlink transmission 105 of control information without interfering the downlink transmission 105 of control information since the uplink transmission 107 is performed only in the punctured area (e.g., a punctured resource block, punctured resource elements, or a punctured block of symbols) of the downlink transmission 105 of control information.

For example, referring to the example shown FIG. 4, although an uplink transmission 107 from the transmitter $103_1$ or the other transmitter $103_2$ is taking place simultaneously to the downlink transmission 105 of control information from the transceiver 101, the uplink transmission 107 does not interfere the downlink transmission 105 of control information, since the uplink transmission 107 is performed only in the punctured area (e.g., a punctured resource block, punctured resource elements, or a punctured block of symbols) of the downlink transmission 105, such that the transmitter $103_1$ and also the receiver $103_3$ can receive the punctured downlink transmission 105 of control information from the transceiver 101.

Thus, the uplink transmission 107 of the transmitter $103_1$ does not cause a self-interference 117 on the downlink transmission 105 of control information and also does not cause an interference 119 on the downlink transmission 105 to another receiver $103_3$. Similarly, the uplink transmission 107 of the other transmitter $103_2$ does not cause an interference 121 to the downlink transmission 105 of control information to the transmitter $103_1$ and also does not cause an interference on the downlink transmission 105 of control information to the receiver $103_3$.

As shown by way of example in FIG. 4, the transceiver 101 can comprise a transmitting unit 109 configured to transmit the downlink transmission 105 and optionally a receiving unit 111 configured to receive the uplink transmission 107. The transmitter $103_1$ can comprise a transmitting unit $113_1$ configured to transmit the uplink transmission 107 and optionally a receiving unit $115_1$ configured to receive the downlink transmission 105. The receiver $103_3$ can comprise a receiving unit $115_3$ configured to receive the downlink transmission 105.

The transceiver 101 can be, for example, a base station, such as one of the base stations $eNB_1$ to $eNB_5$ shown in FIG. 1.

The transmitter $103_1$ can be, for example, a user equipment or IoT device, such as one of the user equipment's $UE_1$ to $UE_3$ or one of the IoT devices $110_1$ to $110_2$ shown in FIG. 1. The transmitter $103_2$ can be, for example, a user equipment or IoT device, such as one of the user equipment's $UE_1$ to $UE_3$ or one of the IoT devices $110_1$ to $110_2$ shown in FIG. 1. The receiver $103_3$ can be, for example, a user equipment or IoT device, such as one of the user equipment's $UE_1$ to $UE_3$ or one of the IoT devices $110_1$ to $110_2$ shown in FIG. 1.

Subsequently, embodiments of the transceiver 101 and the transmitter $103_1$ are described in further detail. Thereby, it is exemplarily assumed that the transceiver 101 is base station and that the transmitter $103_1$ is a user equipment. However, the transceiver 101 and the transmitter $103_1$ are not limited to such embodiments. Rather, it is also possible that the transceiver 101 is a user equipment and that the transmitter $103_1$ is a base station or that both, the transceiver 101 and the transmitter $103_1$, are base stations or user equipment's.

General Description

Embodiments tackle the case when a downlink (DL) transmission can coexist with an uplink (UP) transmission in the same frequency band/time and vice versa. Hence, the coexisting UL/DL resource or frame (in term of time and frequency) ratio can be variable from 0 to 100%. In this case, embodiments provide a methodology and technique to empty/puncture/evacuate the legacy control information in DL to accommodate an UL transmission without considering any inter-user interference. In this case with no major interference on the UE, only the BS is assumed to support full duplex communication.

In embodiments, for punctured/emptied/evacuated control information, the user equipment(s) has (have) to be informed about the puncturing using a suitable indication. The indication can be embedded in the downlink control information/the remaining control information/a dedicated part of the control information.

In embodiments, If Dynamic puncturing is not supported, an offline/pre-configured/data-base-based control information shall be considered where the UE knows exactly the puncturing pattern forehand.

In embodiments, for the UL control information, the UE can select to send the UL control information during the dedicated grants for uplink control time and frequency period. Another solution is to consider UL control information during the granted UL transmission period/frequency, i.e., in-band/in-data uplink-control information. The UL control information can also coexist with DL data or control if needed. In other case, the UL control information can be transmitted in dedicated frequency bands, or based on traffic and use-cases needs; this can be decided centrally or based on distributed fashion.

Note that, embodiments also relate to an UE supporting full-duplex, as described in further detail below.

Transmission Scenario

In embodiments, a full duplex transmission, where more than a user is performing UL and DL simultaneously using a full-duplex communication supported only at the Base-station (BS). If a single UE supports full-duplex communication, then the UE is allowed to use the same mechanism done as well.

Figure 5:
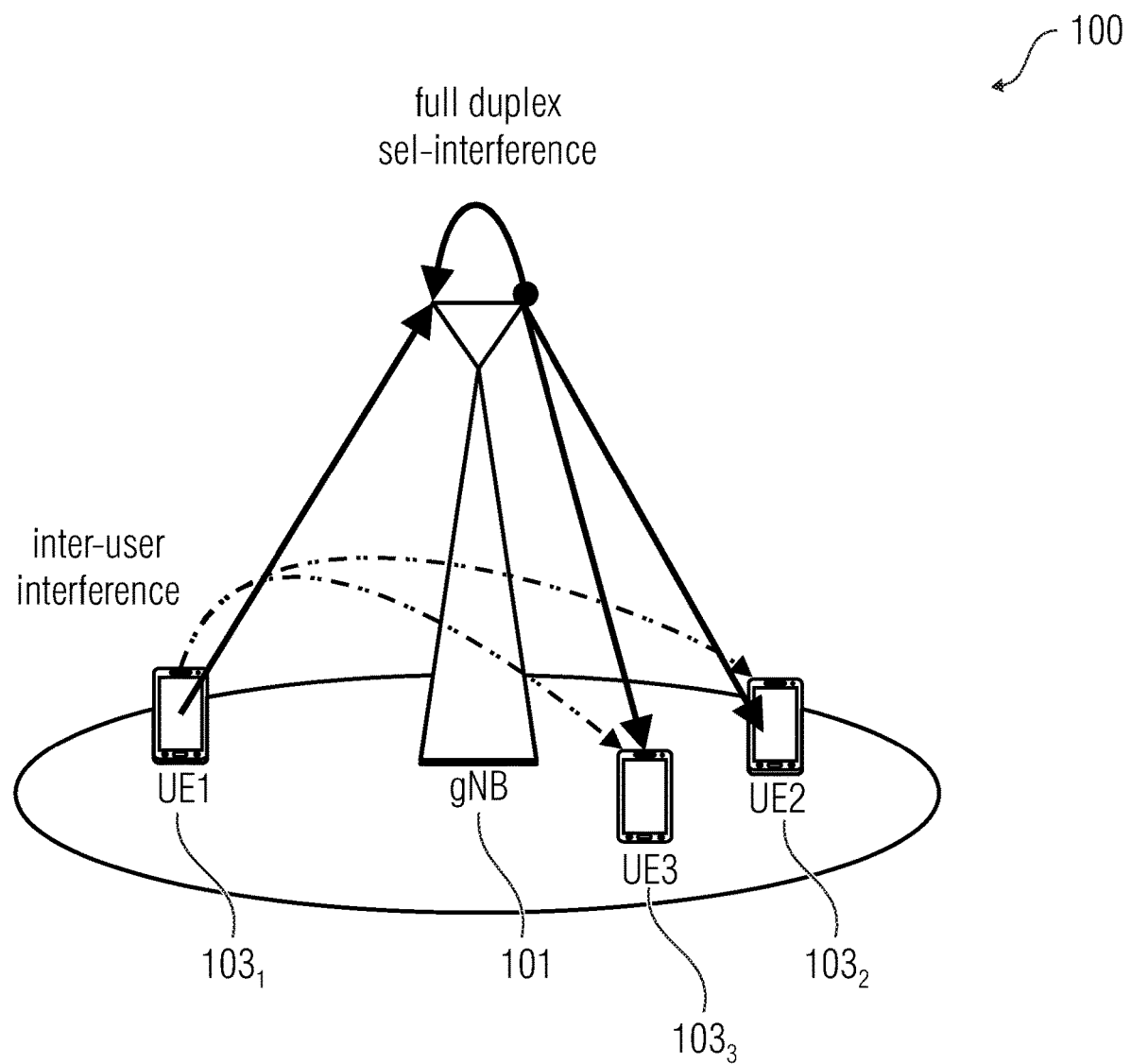
FIG. 5 shows a full duplex scenario and coexistence of on demand UL together with the TDD scheduled DL subframe.

FIG. 5 describes the case when three users $103_1$, $103_2$ and $103_3$ are transmitting within the same band, i.e., user 2 (UE 2) $103_2$ and user 3 (UE 3) $103_3$ are receiving a DL transmission frame (also known as sub-frame, SF) (e.g. from a base station 101 (gNB)) while user 1 (UE 1) $103_1$ is transmitting in the UL frame.

Subsequently, embodiments of the transceiver 101 (e.g., base station) and transmitter $103_1$ (e.g., user equipment) are described making reference to FIGS. 5 to 9. Thereby, FIGS. 5 to 9 show in diagrams allocations of the communication channel of the wireless communication network 100. In FIGS. 5 to 9 it is assumed that a first slot (slot 0) and a fourth slot (slot 3) are downlink slots, i.e. slots normally allocated to downlink transmissions from the transceiver 101, and that a third (slot 3) is an uplink slot, i.e. a slot normally allocated to an uplink transmission from the transmitter $103_1$. In each downlink slot (e.g., slot 0 and slot 3), first downlink control information (DCI) 609 is transmitted, e.g., using a physical downlink control channel (PDCCH), and afterwards downlink data 603 is transmitted.

Figure 6:
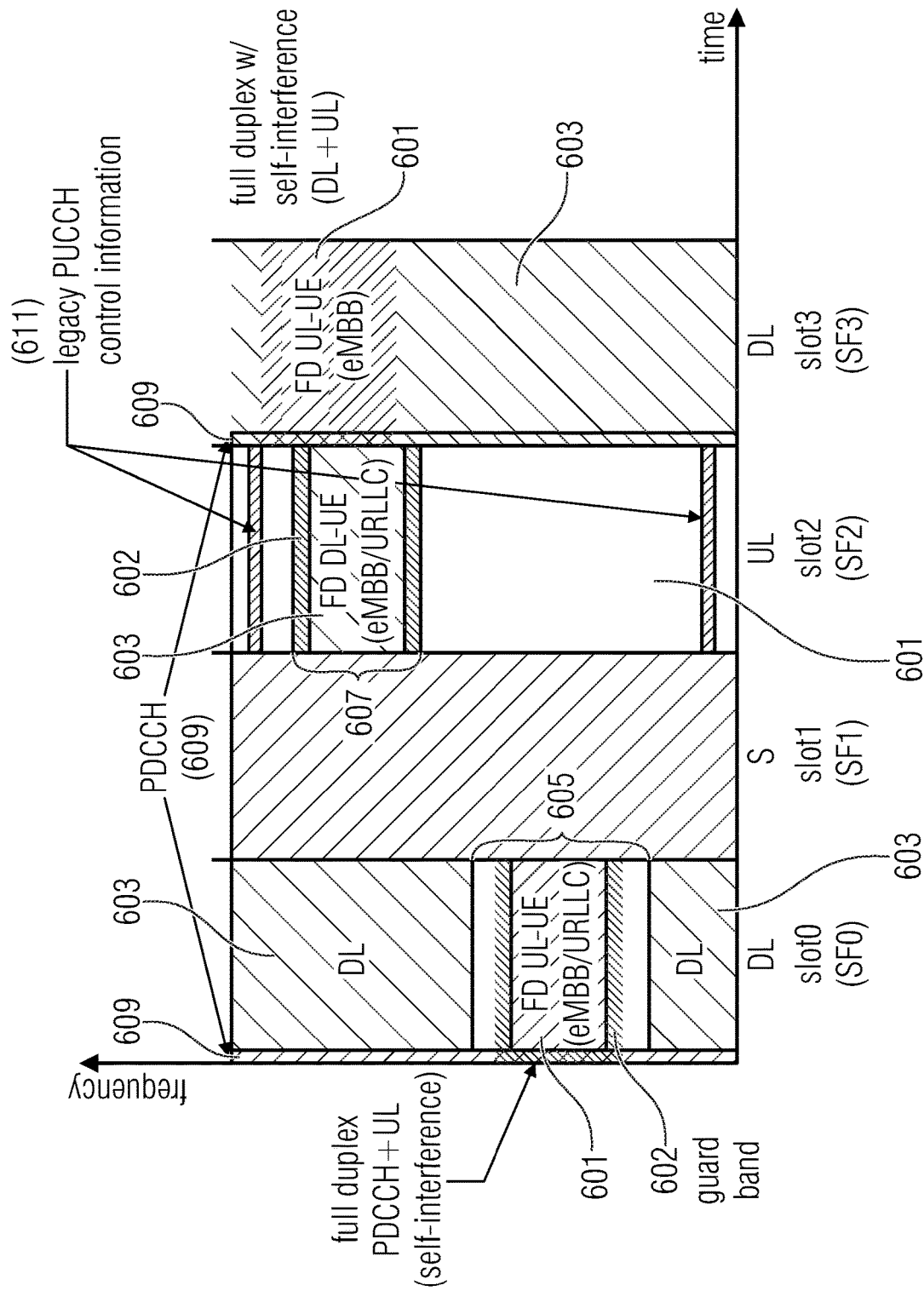
FIG. 6 shows on-demand FDC for asymmetric traffic considering continuous (legacy/state-of-the art) PDCCH transmission and legacy PUCCH.

FIG. 6 shows in a diagram an allocation of the communication channel of the wireless communication network 100. Thereby, the ordinate denotes the frequency and the abscissa the time.

In the first slot (slot 0), a non-punctured downlink transmission of control information 609 and afterwards a downlink transmission of data 603 is performed. Since the downlink channel is not fully occupied during the first slot (slot 0) during the downlink transmission of data 603, an uplink transmission 601 can be performed after the downlink transmission of control information 609 in the downlink free area 605. A guard band 602 can be used between the downlink transmission and the uplink transmission.

In the third slot (slot 2), an uplink transmission 601 is performed. Since the uplink channel is not fully occupied during the third slot (slot 2), a downlink transmission 603 can be performed in an uplink free area 607 with a guard band 602 between the uplink transmission 601 and the downlink transmission. Further, uplink control information (e.g., legacy physical uplink control channel (PUCCH) control information) 611 can be transmitted.

In the fourth slot (slot 3), a non-punctured downlink transmission of control information 609 and afterwards a downlink transmission of data 603 is performed. Since the downlink channel is almost fully occupied during the third slot (slot 3) during the downlink transmission of data 603, the uplink transmission 601 interferes on the downlink transmission of data 603.

In other words, FIG. 6 discusses the case when the duplexing between the UL 601 and DL 603 can be with a low traffic, i.e., Slot/SF 0, where the DL 603 and UL 601 coexist with an FDM manner without interference, either self-interference at the BS 101 or inter-user (UE-to-UE) interference. Another case when the traffic is a bit high, hence the DL 603 and the UL 601 are also coexisting in FDM manner; however, keeping only a guard band 602 between them, e.g., as in Slot/SF 2. The design of the guard band is a design issue so far. Finally, Slot or SF 3 assumes very high traffic where the UL 603 and DL 601 are producing interference on the base-station 101, i.e., self-interference and the UL 601 UE is interfering the DL 603 UEs (e.g., UE 3 is interfering UE 1, 2 in FIG. 5). In this figure, the control information is assumed to be existing in DL as legacy. However, differs from the DL 603, the UL 601 can exist in any dedicated bands during the UL-FD period and Frequency or during the legacy/normal/guaranteed UL slots/frequency.

Figure 7:
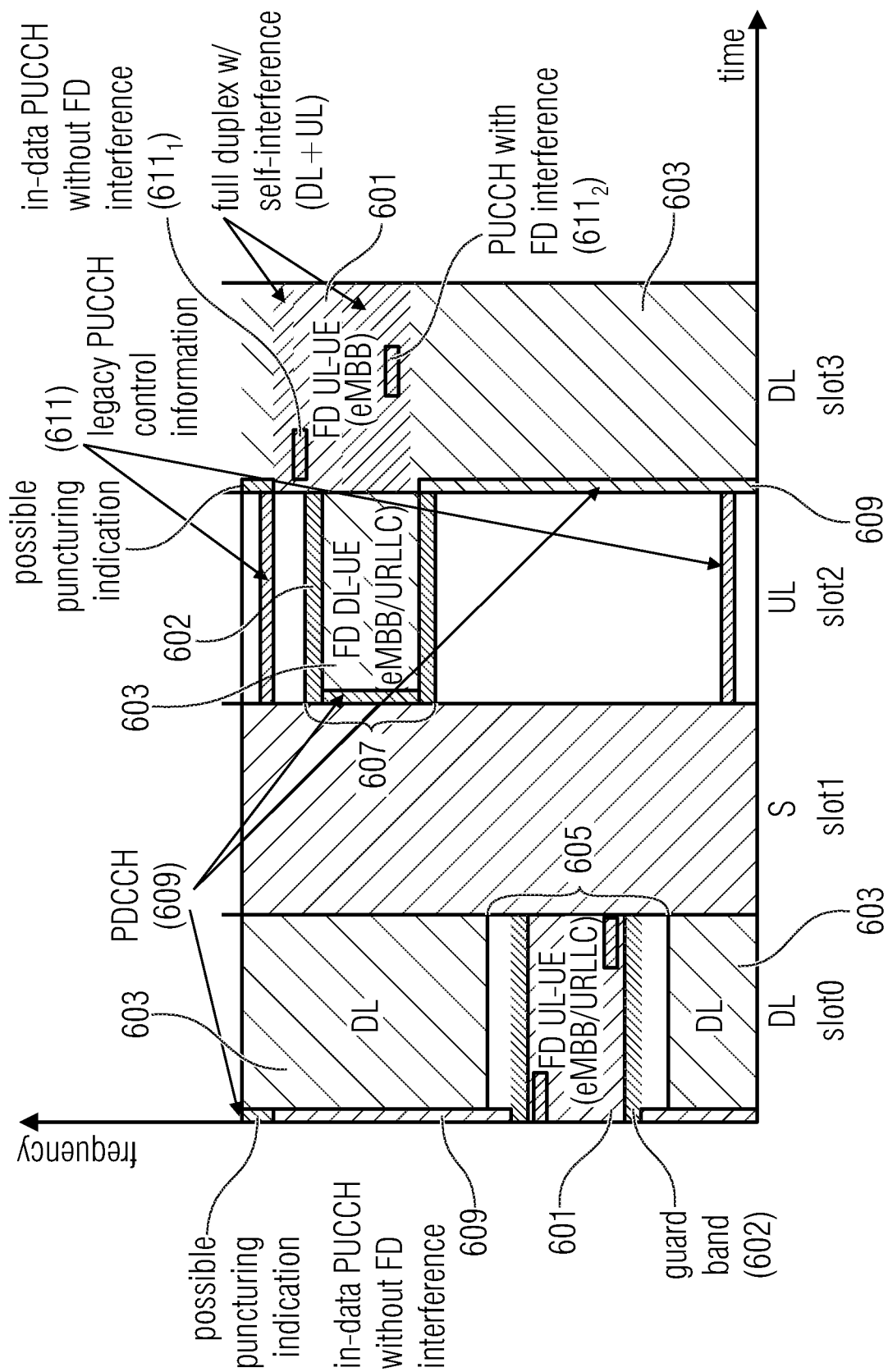
FIG. 7 shows on-demand FDC for asymmetric traffic with empty/punctured/evacuated/shortened PDCCH, indication of puncturing (only fixed is plotted), and adaptive/on-demand interfered and not interfered PUCCH.

FIG. 7 shows in a diagram an allocation of the communication channel of the wireless communication network 100. Thereby, the ordinate denotes the frequency and the abscissa the time.

In the first slot (slot 0), a punctured downlink transmission of control information 609 and afterwards a downlink transmission of data 603 is performed. The puncturing of the downlink transmission of control information 609 leads to a downlink free area 605 of the downlink transmission of control information 609 that can be used to perform an interference free uplink transmission 601. Since also a corresponding area of the downlink transmission of data 603 is free, the uplink transmission 601 does not cause an interference on the downlink transmission of data 603. A guard band can be used between the downlink transmission and the uplink transmission.

In the third slot (slot 2), an uplink transmission 601 is performed. Since the uplink channel is not fully occupied during the third slot (slot 2), a downlink transmission 603 can be performed in an uplink free area 607 with a guard band 602 between the uplink transmission 601 and the downlink transmission. Further, uplink control information (e.g., legacy physical uplink control channel (PUCCH) control information) 611 can be transmitted.

In the fourth slot (slot 3), a punctured downlink transmission of control information 609 and afterwards a downlink transmission of data 603 is performed. The puncturing of the downlink transmission of control information 609 leads to a downlink free area of the downlink transmission of control information 609 that can be used to perform an interference free uplink transmission 601. However, since the downlink channel is almost fully occupied during the third slot (slot 3) during the downlink transmission of data 603, the uplink transmission 601 leads to an interference on the downlink transmission of data 603. Further, in-data uplink control information (e.g., physical uplink control channel (PUCCH) control information) $611_1$ and $611_2$ can be transmitted, wherein the in-data uplink control information $611_1$ allocated in a downlink free area of the downlink transmission of data 603 does not cause an interference, and wherein the in-data uplink control information $611_2$ allocated in a non-free area of the downlink transmission of data 603 causes an interference on the downlink transmission of data 603.

In other words, in contrast to FIG. 6, FIG. 7 shows the punctured physical downlink control channel (PDCCH) 609 with possible puncturing indication location in the downlink control information (DCI) according to the concept of the present invention. This indication location can be kept fixed or can be dynamically configured based on the needs and the traffic. In this case, the DL control information will not be interfered with the FD communication. Additionally, for full duplex DL 603 transmission inside the allocated UL bands, a shorten DCI frames can be transmitted if needed.

FIG. 7 also shows also a non-legacy UL control information (UCI) 611 which appears in-band/in-data transmission. Based on the quality used for this UCI, it can be allocated only to the un-coexisting regions (without simultaneous UL/D) or to the FD interfering (managed) region. In case of 100% FD utilization, 100% UL and 100% DL, the control information is kept in a legacy format.

Figure 8:
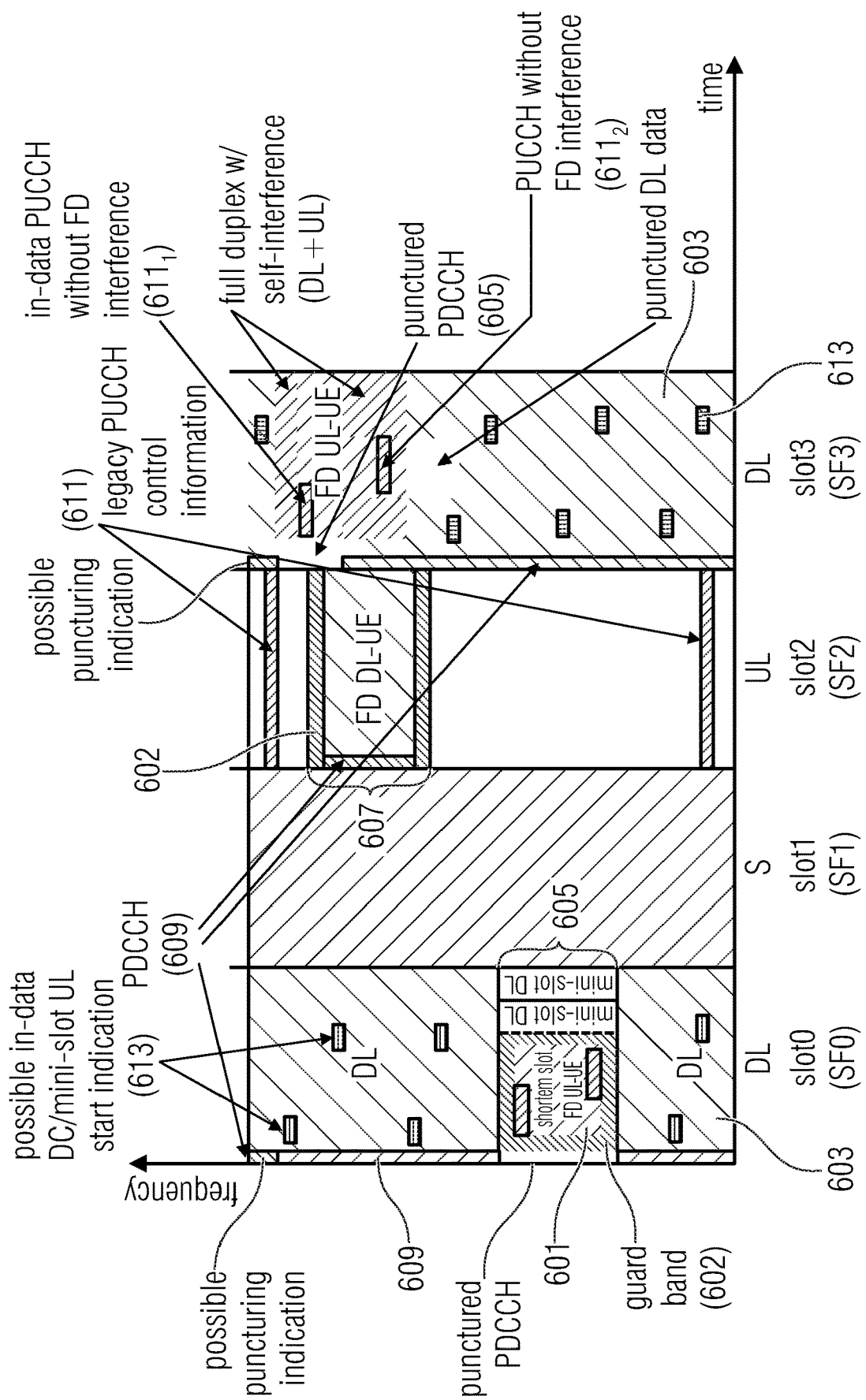
FIG. 8 shows an URLLC/eMBB FDC for asymmetric traffic with empty/punctured/evacuated/shortened PDCCH, indication of puncturing, punctured DL Data, and sTTI DL/UL coexistence avoiding control channel interference.

FIG. 8 shows in a diagram an allocation of the communication channel of the wireless communication network 100. Thereby, the ordinate denotes the frequency and the abscissa the time.

In the first slot (slot 0), a punctured downlink transmission of control information 609 and afterwards a downlink transmission of data 603 is performed. The puncturing of the downlink transmission of control information 609 leads to a downlink free area 605 of the downlink transmission of control information 609 that can be used to perform an interference free uplink transmission 601. Since also a corresponding area of the downlink transmission of data 603 is free, the uplink transmission 601 does not cause an interference on the downlink transmission of data 603. As shown in detail in FIG. 8, the uplink transmission 601 is performed after the punctured downlink transmission of control information 609 using shortened transmission time intervals (sTTI) or downlink mini-slots. Further, a guard band/guard period 602 can be used between the downlink transmission and the uplink transmission. Furthermore, during the downlink transmission of data 603 also in-data downlink control information (DCI)/mini-slot uplink start indication 613 can be transmitted.

In the third slot (slot 2), an uplink transmission 601 is performed. Since the uplink channel is not fully occupied during the third slot (slot 2), a downlink transmission 603 can be performed in an uplink free area 607 with a guard band 602 between the uplink transmission 601 and the downlink transmission. Further, uplink control information (e.g., legacy physical uplink control channel (PUCCH) control information) 611 can be transmitted.

In the fourth slot (slot 3), a punctured downlink transmission of control information 609 and afterwards a downlink transmission of data 603 is performed. The puncturing of the downlink transmission of control information 609 leads to a downlink free area of the downlink transmission of control information 609 that can be used to perform an interference free uplink transmission 601. In FIG. 8, said uplink transmission 601 is performed after the punctured downlink transmission. However, since the downlink channel is almost fully occupied and only partially punctured during the third slot (slot 3) during the downlink transmission of data 603, the uplink transmission 601 leads to an interference on the downlink transmission of data 603. Further, in-data uplink control information (e.g., physical uplink control channel (PUCCH) control information) 611₁ and 611₂ can be transmitted, wherein the in-data uplink control information 611₁ allocated in a downlink free area of the downlink transmission of data 603 does not cause an interference, and wherein the in-data uplink control information 611₂ allocated in a punctured area (and thus free area) of the downlink transmission of data 603 also does not cause an interference. Furthermore, during the downlink transmission of data 603 also in-data downlink control information (DCI)/mini-slot uplink start indication 613 can be transmitted.

In other words, FIG. 8 shows an URLLC/eMBB FDC for Asymmetric traffic with empty/punctured/evacuated/shortened PDCCH, indication of puncturing, punctured DL Data, and sTTI DL/UL coexistence avoiding control channel interference. For UL, an indication for a mini-slot start for UL UE is transmitted in dedicated slots or multiplexed with data. For protecting the UL control information, the downlink data could be punctured on mini-slot bases. Therefore, an indication can be transmitted to identify punctured data in Time and Frequency.

Referring again to FIG. 8, in embodiments the transceiver 100 can be configured to reconfigure or redistribute the downlink transmission 105 of control information 609 in a channel allocated to the downlink transmission 105 of control information 609, to obtain within said allocated channel for the downlink transmission 105 of control information 609 a free area 605, free of the downlink transmission 105 of control information 609, for an uplink transmission 107 of a transmitter 103₁ of the wireless communication network 100,
a downlink transmission of the transceiver 101 of the wireless communication network 100, or
a full-duplex communication between the transceiver 101 and the transmitter 103₁ of the wireless communication network 100.

Thereby, the transmitter 103₁ can be configured to perform an uplink transmission 107 to the transceiver 101 of the wireless communication network 100,
a downlink transmission of data from the transceiver of the wireless communication network 100, or
a full-duplex communication between the transceiver 101 and the transmitter 103₁ of the wireless communication network 100 in a channel allocated to a downlink transmission 105 of control information 609 from said transceiver 101, wherein the transmitter 103₁ is configured to perform said uplink transmission 107, downlink transmission of data or full-duplex communication in a free area 605, free of the downlink transmission 105 of control information 609, of said channel allocated to the downlink transmission 105 of control information 609 responsive to a control information resource reconfiguration or redistribution indication information 609, 613 indicating said free area 605 or indicating the downlink control information resources used for the downlink transmission 105 of control information 609.

In embodiments, the transceiver 101 can be configured to reconfigure or redistribute the downlink transmission of control information 609 by reducing a number of downlink control information resources in one out of time domain and frequency domain to obtain said free area 605, free of the downlink transmission of control information 609.

In embodiments, the transceiver 101 can be configured to reconfigure or redistribute the downlink transmission of control information 609 by increasing, in accordance with the reduction of the number of control information resources in one out of time domain and frequency domain, the number of downlink control information resources in the other one out of time domain and frequency domain for the transmission of the downlink control information 609.

In embodiments, the transceiver 101 can be configured to transmit a control information resource indication information 609, 613 in the downlink transmission 105 of control information or in a preceding downlink transmission of control information, said control information resource reconfiguration or redistribution indication information indicating
- said free area 605 free of the downlink transmission 105 of control information, and/or
- the downlink control information resources used for the downlink transmission (105) of control information.

Figure 9:
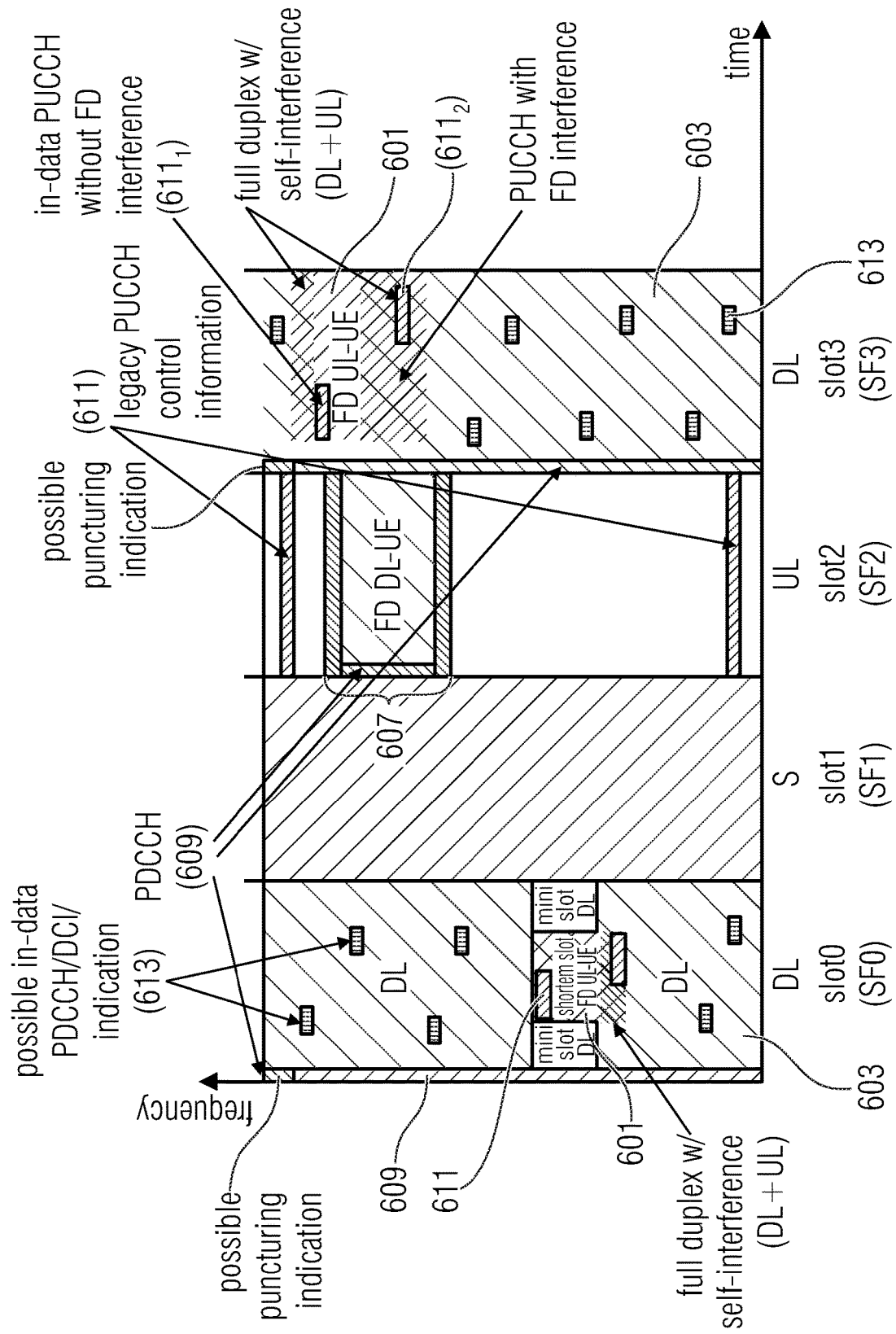
FIG. 9 shows an URLLC/eMBB FDC for asymmetric traffic without puncturing the DL control and the DATA control. UL UE are indicated to transmit with a late minislot/short-transmit time interval (sTTI) offset delayed after the PDCCH is transmitted.

FIG. 9 shows in a diagram an allocation of the communication channel of the wireless communication network 100. Thereby, the ordinate denotes the frequency and the abscissa the time.

In the first slot (slot 0), a non-punctured downlink transmission of control information 609 and afterwards a downlink transmission of data 603 is performed. Further, an uplink transmission 601 is performed after performed after the punctured downlink transmission of control information 609 using shortened transmission time intervals (sTTI) or downlink mini-slots, wherein the uplink transmission is delayed by at least one shortened transmission time interval (sTTI) or downlink mini-slot, in order to avoid interfering the downlink transmission of control information 609. Since the downlink transmission of data 603 is not completely free, the uplink transmission 601 does cause an interference on the downlink transmission of data 603. Further, during the downlink transmission of data 603 also in-data downlink control information (DCI)/mini-slot uplink start indication 613 can be transmitted. Furthermore, in-data uplink control information (e.g., physical uplink control channel (PUCCH) control information) 611 can be transmitted during the uplink transmission 601.

In the third slot (slot 2), an uplink transmission 601 is performed. Since the uplink channel is not fully occupied during the third slot (slot 2), a downlink transmission 603 can be performed in an uplink free area 607 with a guard band 602 between the uplink transmission 601 and the downlink transmission. Further, uplink control information (e.g., legacy physical uplink control channel (PUCCH) control information) 611 can be transmitted.

In the fourth slot (slot 3), a non-punctured downlink transmission of control information 609 and afterwards a downlink transmission of data 603 is performed. The puncturing of the downlink transmission of control information 609 leads to a downlink free area of the downlink transmission of control information 609 that can be used to perform an interference free uplink transmission 601. In FIG. 9, said uplink transmission 601 is performed after the punctured downlink transmission and further delayed, for example, by at least one shortened transmission time interval (sTTI) or mini-slot. However, since the downlink channel is almost fully occupied during the third slot (slot 3) during the downlink transmission of data 603, the uplink transmission 601 leads to an interference on the downlink transmission of data 603. Further, in-data uplink control information (e.g., physical uplink control channel (PUCCH) control information) $611_1$ and $611_2$ can be transmitted, wherein the in-data uplink control information $611_1$ allocated in a downlink free area of the downlink transmission of data 603 does not cause an interference, and wherein the in-data uplink control information $611_2$ allocated in a non-free area of the downlink transmission of data 603 causes an interference on the downlink transmission of data 603. Furthermore, during the downlink transmission of data 603 also in-data downlink control information (DCI)/mini-slot uplink start indication 613 can be transmitted.

In other words, similar to FIG. 8, in FIG. 9 the cases without puncturing the DL control and the DATA control. UL UE are indicated to transmit with a late mini-slot/short-transmit time interval (sTTI) offset delayed after the PDCCH is transmitted. To protect the UL PUCCH, a frequency hopping (frequency diversity) or time diversity can be supported.

Benefit of Embodiments of the Present Invention

Embodiments provide a dynamic and flexibility of the TDD frequency resources:
- Support FD utilizing TDD bands and frame format in FDMed/TDMed manner
  - Coexistence with and without guard bands, i.e., reducing inter-user interference
- Full duplex with limited interference
  - Based on the traffic requirements, FD interference can be limited (FFS optimization)
- Suitable for co-existing with dynamic TDD configurations
- Supports Asymmetric UL/DL traffic/service demands
- Flexibility to schedule UL/DL grants in time and frequency domain as per service requirements
- Flexibility to reduce latency for ultra-reliable and low latency communication, so do enhance the control channel reliability by allowing puncturing in downlink data and control
- Solution Description Subsequently, embodiments about puncturing the PDCCH (downlink control information) based on full duplex existence are described.

According to a first embodiment, the downlink (DL) transmission of any control information can be evacuated/emptied/punctured within a decided full-duplex transmission in the opposite direction (uplink) or for any form of flexible duplexing.

In embodiments, the case is tackled when a downlink (DL) transmission can coexist with an uplink (UP) transmission in the same frequency band and vice versa.

In embodiments, the coexisting ratio can be variable from 0 to 100%.

In embodiments, the legacy control information in DL can be emptied/punctured/evacuated to accommodate an UL transmission without considering any inter-user interference.

In embodiments, only the BS is assumed to support full duplex communication.

In embodiments, for full duplex DL transmission inside the allocated UL bands, a shorten DCI frames can be transmitted if needed.

In embodiments, in order to compensate for the data loss in the downlink control information due to puncturing/evacuation/emptying/shortening process, the number of downlink control information symbols in time domain can be increased accordingly.

For a UE supporting FD communication, see the below described fifth embodiment.

According to a second embodiment, a puncturing indication can be transmitted within the PDCCH transmission. The puncturing indication could be a persistent position in the PDCCH field. It can also be within the shorten/reduced/ remaining PDCCH. The puncturing-indication position can be covered with or without full-duplex. It can be static or dynamically configured.

In embodiments, for punctured/emptied/evacuated control information, the user equipment(s) may have to be informed about the puncturing using a suitable indication.

In embodiments, the indication can be embedded in the downlink control information/the remaining control information/a dedicated part of the control information.

In embodiments, quasi-static puncturing can be used. If Dynamic puncturing is not supported, an offline/pre-configured/data-base-based control information shall be considered where the UE knows exactly the puncturing pattern forehand.

According to a third embodiment, an uplink control information can allow full-duplex with the DL data transmission. UL/DL control information can coexist if puncturing is not supported.

In embodiments, for the UL control information, the UE can select to send the UL control information during the decided uplink control time and frequency period.

In embodiments, another solution is to consider UL control information during the granted UL transmission period/frequency, i.e., in-band/in-data uplink-control information.

In embodiments, the UL control information can also coexist with DL data or control if needed. In other case, the UL control information can be transmitted in dedicated frequency bands, or based on needs.

According to a fourth embodiment, the transmission direction can be changed for full-duplex requirements.

In embodiments, in case of FD-TDD, the transmission can be defined with the special frame as in the legacy and can also be indicated in the UE DCI. Hence, this can be added to the DCI fields.

According to a fifth embodiment, for a UE supporting FD communication, the UE can be treated as two UEs configuring simultaneous UL and DL control information as in the first embodiment and/or the second embodiment.

In embodiments, for UL and DL control information in an FD enabled UE, it is important to handle the locations, grants and puncturing (if needed) for both UL and DL in the DCI and UCI.

In embodiments, another option is not to multiplex UCI and DCI with Full Duplex. Hence, an evaluated transmission in UL and DL (evacuated/emptied/punctured from simultaneous UL and DL transmission) shall be designed.

Application Fields

Latency-constrained (mission-critical) communication services, Multilevel QoS services, Narrow-band IoT devices, mMTC, ultra-reliable communication, enhanced Multiple access (MA) scheme and MAC channels.

Assumptions

Relative locations of eNBs and all the users

Used SINR (or rather the INR) at each receiver; if the INR is high, then a fallback to the legacy frame formatting or SDMA can be used Transmit power limitations; transmit power control to minimize the interference Interference:

Self-interference at the base-station; handled by the eNB self-interference mitigation mechanisms Intra-cell UE-to-UE: which will be reduced using wider distance for FDC enabled UEs Self-interference at the base-station; handled by the eNB self-interference mitigation mechanisms Intra-cell UE-to-UE: which will be reduced using wider distance for FDC enabled UEs The proposed idea is certainly independent of the used radio access technology (RAT) or the radio frequency band.

This invention is also independent of the network architecture and the deployment scenarios.

If the UE supports full-duplex, the self-interference is handled at the UE

Further Embodiments

Figure 10:
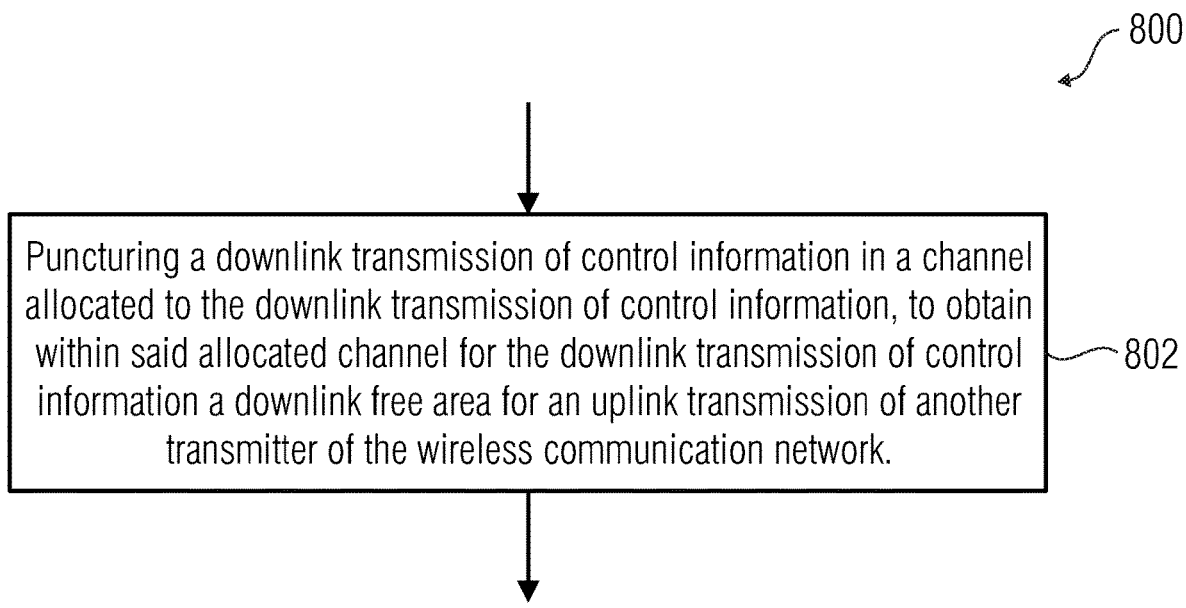
FIG. 10 shows a flowchart of a method for operating a transceiver of a wireless communication network.

FIG. 10 shows a flowchart of a method 800 for operating a transceiver of a wireless communication network. The method 800 comprises a step 802 of puncturing a downlink transmission of control information in a channel allocated to the downlink transmission of control information, to obtain within said allocated channel for the downlink transmission of control information a downlink free area for an uplink transmission of another transmitter of the wireless communication network.

Figure 11:
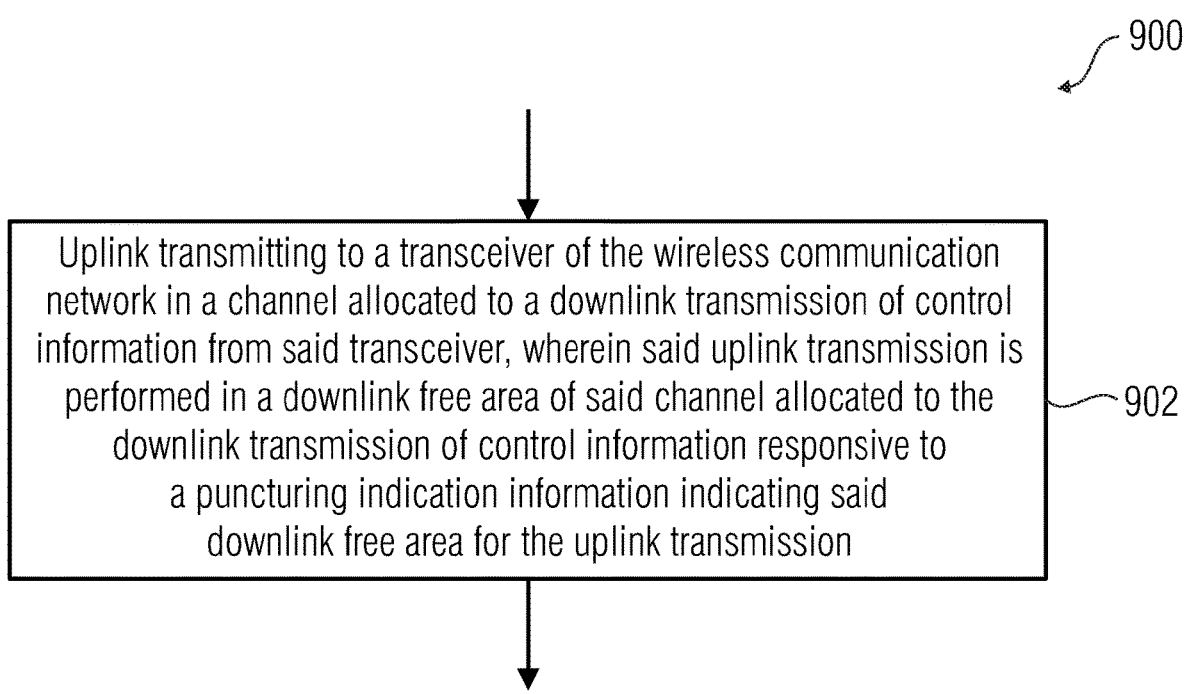
FIG. 11 shows a flowchart of a method for operating a transmitter of a wireless communication network.

FIG. 11 shows a flowchart 900 of a method for operating a transmitter of a wireless communication network. The method 900 comprises a step 902 of uplink transmitting to a transceiver of the wireless communication network in a channel allocated to a downlink transmission of control information from said transceiver, wherein said uplink transmission is performed in a downlink free area of said channel allocated to the downlink transmission of control information responsive to a puncturing indication information indicating said downlink free area for the uplink transmission.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 12 illustrates an example of a computer system 500. The units or modules as well as the steps of the methods performed by these units may execute on one or more computer systems 500. The computer system 500 includes one or more processors 502, like a special purpose or a general purpose digital signal processor. The processor 502 is connected to a communication infrastructure 504, like a bus or a network. The computer system 500 includes a main memory 506, e.g., a random access memory (RAM), and a secondary memory 508, e.g., a hard disk drive and/or a removable storage drive. The secondary memory 508 may allow computer programs or other instructions to be loaded into the computer system 500. The computer system 500 may further include a communications interface 510 to allow software and data to be transferred between computer system 500 and external devices. The communication may be in the form electronic, electromagnetic, optical, or other signals capable of being handled by a communications interface. The communication may use a wire or a cable, fiber optics, a phone line, a cellular phone link, an RF link and other communications channels 512.

The terms "computer program medium" and "computer readable medium" are used to generally refer to tangible storage media such as removable storage units or a hard disk installed in a hard disk drive. These computer program products are means for providing software to the computer system 500. The computer programs, also referred to as computer control logic, are stored in main memory 506 and/or secondary memory 508. Computer programs may also be received via the communications interface 510. The computer program, when executed, enable the computer system 500 to implement the present invention. In particular, the computer program, when executed, enable processor 502 to implement the processes of the present invention, such as any of the methods described herein. Accordingly, such a computer program may represent a controller of the computer system 500. Where the disclosure is implemented using software, the software may be stored in a computer program product and loaded into computer system 500 using a removable storage drive, an interface, like communications interface 510.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

List of Acronyms and Symbols eNB Evolved Node B (3G base station)
LTE Long-Term Evolution
UE User Equipment (User Terminal)
ACLR Adjacent channel leakage ratio
TDD Time Division Duplex
FDD Frequency Division Duplex
OFDMA Orthogonal Frequency-Division Multiple Access
CQI Channel Quality Information
CRC Cyclic Redundancy Check
SPS Semi-persistent Scheduling
DCI Downlink Control Information
UL Uplink
DL Downlink
(s)TTI (short) Transmission Time Interval
PUSCH Physical Uplink Shared Channel
PUCCH Physical Uplink Control Channel
PDSCH Physical Downlink Shared Channel
PDCCH Physical Downlink Control Channel
URLLC Ultra-reliable Low-latency Communications
RAT Radio Access Technology
SR scheduling request
HARQ hybrid automatic repeat request
QoS hybrid automatic repeat request
URLLC ultra-reliable and low latency communications
MCS Modulation coding scheme

LIST OF REFERENCES

[1] NGMN Alliance A White Paper "Small Cell Backhaul Requirements", Version 1.0, Jun. 4, 2012

The invention claimed is:

1. A transceiver of a wireless communication network, the transceiver comprising:
a transceiver unit configured to puncture a downlink transmission of control information in a channel allocated to the downlink transmission of control information, to acquire within the allocated channel for the downlink transmission of control information a downlink free area for an uplink transmission of a transmitter of the wireless communication network,
wherein the transceiver unit is configured to transmit to the transmitter a puncturing indication information in the downlink transmission of control information or in a preceding downlink transmission of control information, the puncturing indication information indicating the downlink free area for the uplink transmission of another transmitter of the wireless communication network.

2. The transceiver according to claim 1, wherein the uplink transmission is performed simultaneously to the downlink transmission of control information without interfering the downlink transmission of control information since the uplink transmission is performed only in a punctured resource block or in punctured resource elements or in a punctured block of symbols of the downlink transmission of control information.

3. The transceiver according to claim 1, wherein the downlink free area is an area free of the downlink transmission of control information.

4. The transceiver according to claim 1, wherein the transceiver is configured to puncture the downlink transmission of control information responsive to an uplink transmission request or puncturing request from the transmitter or another transmitter of the wireless communication network.

5. The transceiver according to claim 1, wherein the transceiver is configured to puncture the downlink transmission of control information in an area indicated by the uplink transmission request or puncturing request, in order to acquire the downlink free area for the uplink transmission.

6. The transceiver according to claim 1, wherein the channel allocated to the downlink transmission of control information is a physical downlink control channel.

7. The transceiver according to claim 1, wherein the transceiver is configured to transmit the punctured downlink transmission of control information and to receive the uplink transmission from another transmitter in the same frequency band and/or in the same time slot.

8. The transceiver according to claim 6, wherein the transceiver is configured to transmit a puncturing indication information in a persistent position of the physical downlink control channel or in a punctured physical downlink control channel.

9. The transceiver according to claim 1, wherein the transceiver is configured to receive an uplink transmission of control information from another transmitter of the wireless communication network in a downlink free area for the uplink transmission of the transmitter or in an allocated uplink transmission data or control channel.

10. The transceiver according to claim 1, wherein the transceiver is configured to transmit a downlink control information in an uplink free area of a punctured uplink transmission in a channel allocated to the uplink transmission.

11. The transceiver according to claim 1, wherein the transceiver is configured to transmit the punctured portion of the downlink control information in a subsequent channel allocated to the downlink transmission of control information.

12. The transceiver according to claim 1, wherein the transceiver is a base station of the wireless communication network, or wherein the transceiver is a user equipment or internet of things device of the wireless communication network.

13. The transceiver according to claim 1, wherein the transmitter is a user equipment, internet of things device, or base station of the wireless communication network.

14. A transmitter of a wireless communication network, the transmitter comprising:
  a transmitting unit configured to perform an uplink transmission to a transceiver of the wireless communication network in a channel allocated to a downlink transmission of control information from the transceiver, wherein the transmitting unit is configured to perform the uplink transmission in a downlink free area of the channel allocated to the downlink transmission of control information in dependence on a puncturing indication information received from the transceiver, the puncturing indication information indicating the downlink free area for the uplink transmission.

15. The transmitter according to claim 14, wherein the downlink free area is an area free of the downlink transmission of control information.

16. The transmitter according to claim 14, wherein the channel allocated to the downlink transmission of control information is a physical downlink control channel.

17. The transmitter according to claim 14, wherein the transmitter is configured to receive the puncturing indication information from the transceiver in the downlink transmission of control information or in a preceding downlink transmission of control information.

18. The transmitter according to claim 14, wherein the transmitter is configured to receive the puncturing indication information from a database of the wireless communication system.

19. The transmitter according to claim 14, wherein the transmitter is configured to puncture an uplink transmission in a channel allocated to the uplink transmission, to acquire within the allocated channel for the uplink transmission an uplink free area for a downlink transmission of the transceiver or another transmitter of the wireless communication network.

20. The transmitter according to claim 14, wherein the transceiver is a base station of the wireless communication network.

21. The transmitter according to claim 14, wherein the transmitter is a user equipment or base station of the wireless communication network.

22. A wireless communication network, comprising:
  at least one transceiver according to claim 1; and
  at least one transmitter of the wireless communication network, the transmitter comprising:
  a transmitting unit configured to perform an uplink transmission to the at least one transceiver of the wireless communication network in a channel allocated to a downlink transmission of control information from the at least one transceiver, wherein the transmitting unit is configured to perform the uplink transmission in a downlink free area of the channel allocated to the downlink transmission of control information in dependence on a puncturing indication information indicating the downlink free area for the uplink transmission.

23. A method for operating a transceiver of a wireless communication network, the method comprising:
  puncturing a downlink transmission of control information in a channel allocated to the downlink transmission of control information, to acquire within the allocated channel for the downlink transmission of control information a downlink free area for an uplink transmission of a transmitter of the wireless communication network; and
  transmitting to the transmitter a puncturing indication information in the downlink transmission of control information or in a preceding downlink transmission of control information, the puncturing indication information indicating the downlink free area for the uplink transmission of another transmitter of the wireless communication network.

24. A method for operating a transmitter of a wireless communication network, the method comprising:
  uplink transmitting to a transceiver of the wireless communication network in a channel allocated to a downlink transmission of control information from the transceiver, wherein the uplink transmission and/or downlink transmission is performed in a downlink free area of the channel allocated to the downlink transmission of control information in dependence on a puncturing indication information received from the transceiver, the puncturing indication information indicating the downlink free area for the uplink transmission.

25. A non-transitory digital storage medium having stored thereon a computer program for performing a method for operating a transceiver of a wireless communication network, the method comprising:
puncturing a downlink transmission of control information in a channel allocated to the downlink transmission of control information, to acquire within the allocated channel for the downlink transmission of control information a downlink free area for an uplink transmission of a transmitter of the wireless communication network; and
transmitting to the transmitter a puncturing indication information in the downlink transmission of control information or in a preceding downlink transmission of control information, the puncturing indication information indicating the downlink free area for the uplink transmission of another transmitter of the wireless communication network,
when the computer program is run by a computer.

26. A non-transitory digital storage medium having stored thereon a computer program for performing a method for operating a transmitter of a wireless communication network, the method comprising:
uplink transmitting to a transceiver of the wireless communication network in a channel allocated to a downlink transmission of control information from the transceiver, wherein the uplink transmission and/or downlink transmission is performed in a downlink free area of the channel allocated to the downlink transmission of control information in dependence on a puncturing indication information received from the transceiver, the puncturing indication information indicating the downlink free area for the uplink transmission,
when the computer program is run by a computer.

27. A transceiver of a wireless communication network, the transceiver comprising:
a transceiver unit configured to reconfigure or redistribute a downlink transmission of control information in a channel allocated to the downlink transmission of control information, to acquire within the allocated channel for the downlink transmission of control information a free area free of the downlink transmission of control information for
an uplink transmission of a transmitter of the wireless communication network,
or
a full-duplex communication between the transceiver and the transmitter of the wireless communication network,
wherein the transceiver unit is configured to transmit to the transmitter a resource reconfiguration or redistribution indication information in the downlink transmission of control information or in a preceding downlink transmission of control information, the puncturing indication information indicating the downlink free area for the uplink transmission of another transmitter of the wireless communication network.

28. The transceiver according to claim 27, wherein the transceiver is configured to transmit the reconfigured or redistributed portion of the downlink control information in a subsequent channel allocated to the downlink transmission of control information.

29. The transceiver according to claim 27, wherein the transceiver is configured to reconfigure or redistribute the downlink transmission of control information by reducing a number of downlink control information resources in one out of time domain and frequency domain to acquire the free area, free of the downlink transmission of control information.

30. The transceiver according to claim 29, wherein the transceiver is configured to reconfigure or redistribute the downlink transmission of control information by increasing, in accordance with the reduction of the number of control information resources in one out of time domain and frequency domain, the number of downlink control information resources in the other one out of time domain and frequency domain for the transmission of the downlink control information.

31. The transceiver according to claim 27, wherein the transceiver is configured to transmit a control information resource reconfiguration or redistribution indication information in the downlink transmission of control information or in a preceding downlink transmission of control information, the control information resource reconfiguration or redistribution indication information indicating
the free area free of the downlink transmission of control information, and/or
downlink control information resources used or reconfigured or redistributed for the downlink transmission of control information.

32. A method for operating a transceiver of a wireless communication network, the method comprising:
reconfiguring or redistributing a downlink transmission of control information in a channel allocated to the downlink transmission of control information, to acquire within the allocated channel for the downlink transmission of control information a free area free of the downlink transmission of control information for
an uplink transmission of a transmitter of the wireless communication network,
or
a full-duplex communication between the transceiver and the transmitter of the wireless communication network; and
transmitting to the transmitter a resource reconfiguration or redistribution indication information in the downlink transmission of control information or in a preceding downlink transmission of control information, the puncturing indication information indicating the downlink free area for the uplink transmission of another transmitter of the wireless communication network.

33. A transmitter of a wireless communication network, the transmitter comprising:
a transmitting unit configured to perform
an uplink transmission to a transceiver of the wireless communication network,
or
a full-duplex communication between the transceiver and the transmitter of the wireless communication network
in a channel allocated to a downlink transmission of control information from the transceiver, wherein the transmitter is configured to perform the uplink transmission, downlink transmission of data or full-duplex communication in a free area, free of the downlink transmission of control information, of the channel allocated to the downlink transmission of control information responsive to a resource reconfiguration or redistribution indication information received from the transceiver, the resource reconfiguration or redistribution indication information indicating the free area or indicating downlink control information resources used or reconfigured or redistributed for the downlink transmission of control information.

34. A method for operating a transmitter of a wireless communication network, the method comprising:
   performing one out of
      an uplink transmission to a transceiver of the wireless communication network,
      or
      a full-duplex communication between the transceiver and the transmitter of the wireless communication network
   in a channel allocated to a downlink transmission of control information from the transceiver, wherein the transmitter is configured to perform the uplink transmission, downlink transmission of data or full-duplex communication in a free area, free of the downlink transmission of control information, of the channel allocated to the downlink transmission of control information responsive to a resource indication information received from the transceiver, the resource reconfiguration or redistribution indication information indicating the free area or indicating downlink control information resources used or reconfigured or redistributed for the downlink transmission of control information.

35. A non-transitory digital storage medium having stored thereon a computer program for performing a method for operating a transceiver of a wireless communication network, the method comprising:
   reconfiguring or redistributing a downlink transmission of control information in a channel allocated to the downlink transmission of control information, to acquire within the allocated channel for the downlink transmission of control information a free area free of the downlink transmission of control information for
      an uplink transmission of a transmitter of the wireless communication network,
      or
      a full-duplex communication between the transceiver and the transmitter of the wireless communication network; and
   transmitting to the transmitter a resource reconfiguration or redistribution indication information in the downlink transmission of control information or in a preceding downlink transmission of control information, the puncturing indication information indicating the downlink free area for the uplink transmission of another transmitter of the wireless communication network,
   when the computer program is run by a computer.

36. A non-transitory digital storage medium having stored thereon a computer program for performing a method for operating a transmitter of a wireless communication network, the method comprising:
   performing one out of
      an uplink transmission to a transceiver of the wireless communication network,
      or
      a full-duplex communication between the transceiver and the transmitter of the wireless communication network
   in a channel allocated to a downlink transmission of control information from the transceiver, wherein the transmitter is configured to perform the uplink transmission, downlink transmission of data or full-duplex communication in a free area, free of the downlink transmission of control information, of the channel allocated to the downlink transmission of control information responsive to a resource indication information received from the transceiver, the resource reconfiguration or redistribution indication information indicating the free area or indicating downlink control information resources used or reconfigured or redistributed for the downlink transmission of control information,
   when the computer program is run by a computer.

37. A transceiver of a wireless communication network, the transceiver comprising:
   a transceiver unit which punctures a downlink transmission of control information in a channel allocated to the downlink transmission of control information during the downlink transmission of control information, and which acquires within the allocated channel for the downlink transmission of control information a downlink free area for an uplink transmission of a transmitter of the wireless communication network.

* * * * *